United States Patent
Miyazaki et al.

(10) Patent No.: US 6,546,187 B1
(45) Date of Patent: Apr. 8, 2003

(54) DIGITAL CAMERA FOR PROVIDING RANDOM SPECIAL EFFECT IMAGES AND AN IMAGE PROCESSING METHOD THEREIN

(75) Inventors: Takao Miyazaki, Asaka (JP); Kiyotaka Kaneko, Tokyo (JP); Manabu Hyodo, Asaka (JP); Mikio Watanabe, Asaka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/219,864

(22) Filed: Dec. 24, 1998

(30) Foreign Application Priority Data

Dec. 26, 1997 (JP) .............................................. 9-360089

(51) Int. Cl.[7] ............................. H04N 5/93; H04N 5/91; H04N 5/76; H04N 5/225; H04N 5/262
(52) U.S. Cl. ......................... 386/52; 386/117; 348/239
(58) Field of Search ................................. 386/4, 52–64, 386/38; 348/222, 207, 239–251, 578, 594–595; 358/906, 909.1; 345/700, 722–726

(56) References Cited

U.S. PATENT DOCUMENTS

| 5,228,859 | A | * | 7/1993 | Rowe ......................... 434/118 |
| 5,293,540 | A | * | 3/1994 | Trani et al. .................. 348/584 |
| 5,457,755 | A | * | 10/1995 | Ishida et al. ................ 382/324 |
| 5,513,315 | A | * | 4/1996 | Tierney et al. ................. 714/37 |
| 5,555,098 | A | * | 9/1996 | Parulski ....................... 386/104 |
| 5,633,678 | A | * | 5/1997 | Parulski et al. .............. 348/232 |
| 5,664,216 | A | * | 9/1997 | Blumenau ................... 345/302 |
| 5,692,113 | A | * | 11/1997 | Tatsuta ........................ 395/117 |
| 5,696,850 | A | * | 12/1997 | Parulski et al. ............. 382/261 |
| 5,767,920 | A | * | 6/1998 | Jo ............................... 348/577 |
| 5,905,539 | A | * | 5/1999 | Angell ........................ 348/594 |
| 6,085,019 | A | * | 7/2000 | Ito et al. ........................ 386/52 |
| 6,157,771 | A | * | 12/2000 | Brewer et al. ................ 386/69 |
| 6,248,944 | B1 | * | 6/2001 | Ito ............................ 84/477 R |

* cited by examiner

Primary Examiner—Andrew Christensen
Assistant Examiner—Po Chieu
(74) Attorney, Agent, or Firm—Birch, Stewart, Kolasch & Birch, LLP

(57) ABSTRACT

A digital camera and an image processing method in the digital camera, which make it possible to easily obtain interesting and unexpected images applied with special effects. An imaging system images a subject and converting a subject image into unaltered image data representing an unaltered image of the subject. Then, a special effect selector, which is provided with a random number generator generating a random number, selects one special effect from a plurality of special effects in accordance with the random number. A special effect image processor image-processes the unaltered image data under the special effect selected by the special effect selector so as to obtain special effect image data representing a special effect image. The special effect image data is recorded into an external memory, or sent to an external printer through a communication interface.

32 Claims, 23 Drawing Sheets

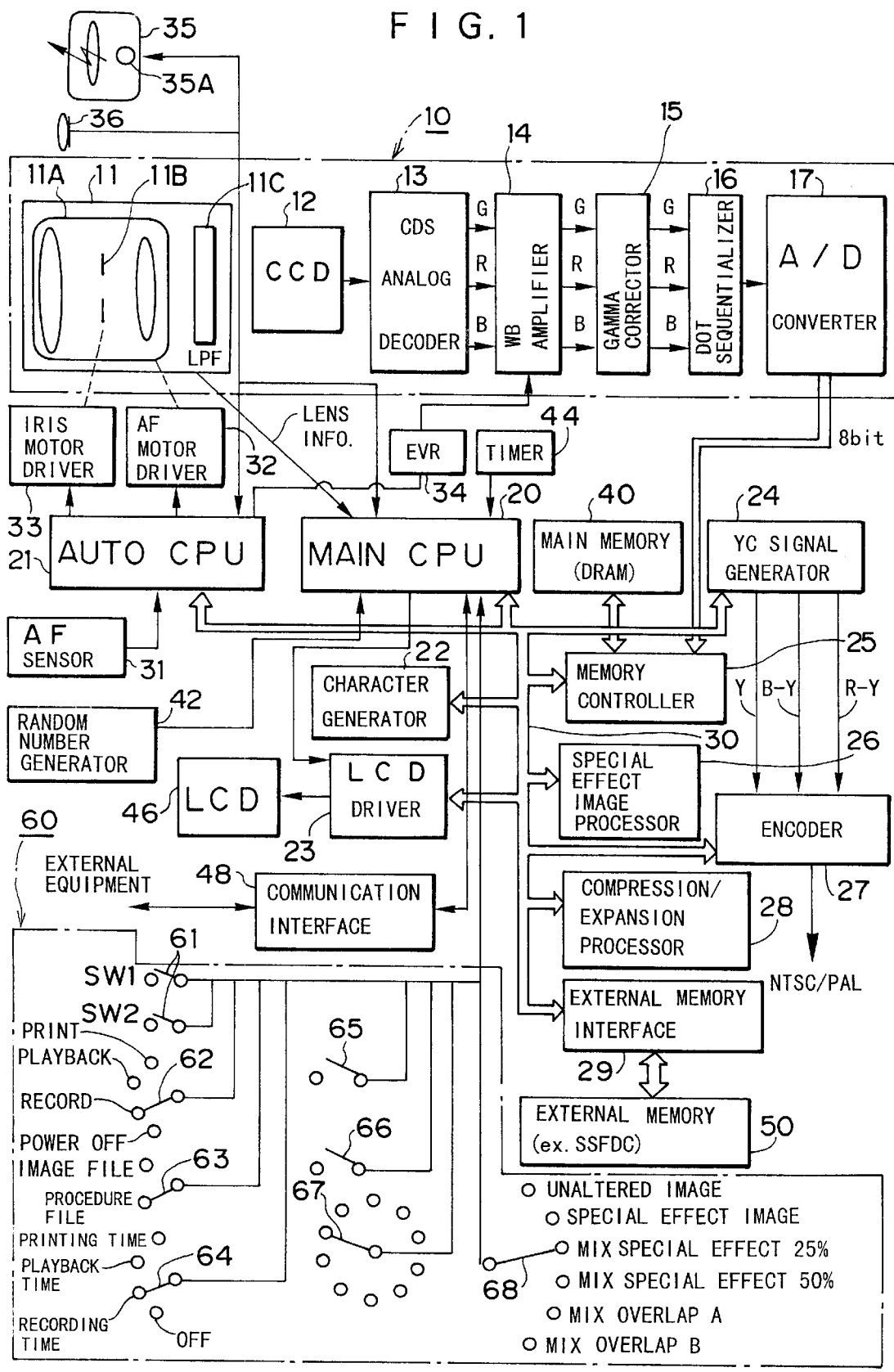
F I G. 1

F I G. 1 1 (A) NORMAL
F I G. 1 1 (B) FAT DEGREE : LITTLE
F I G. 1 1 (C) FAT DEGREE : MEDIUM
F I G. 1 1 (D) FAT DEGREE : MUCH

F I G. 21
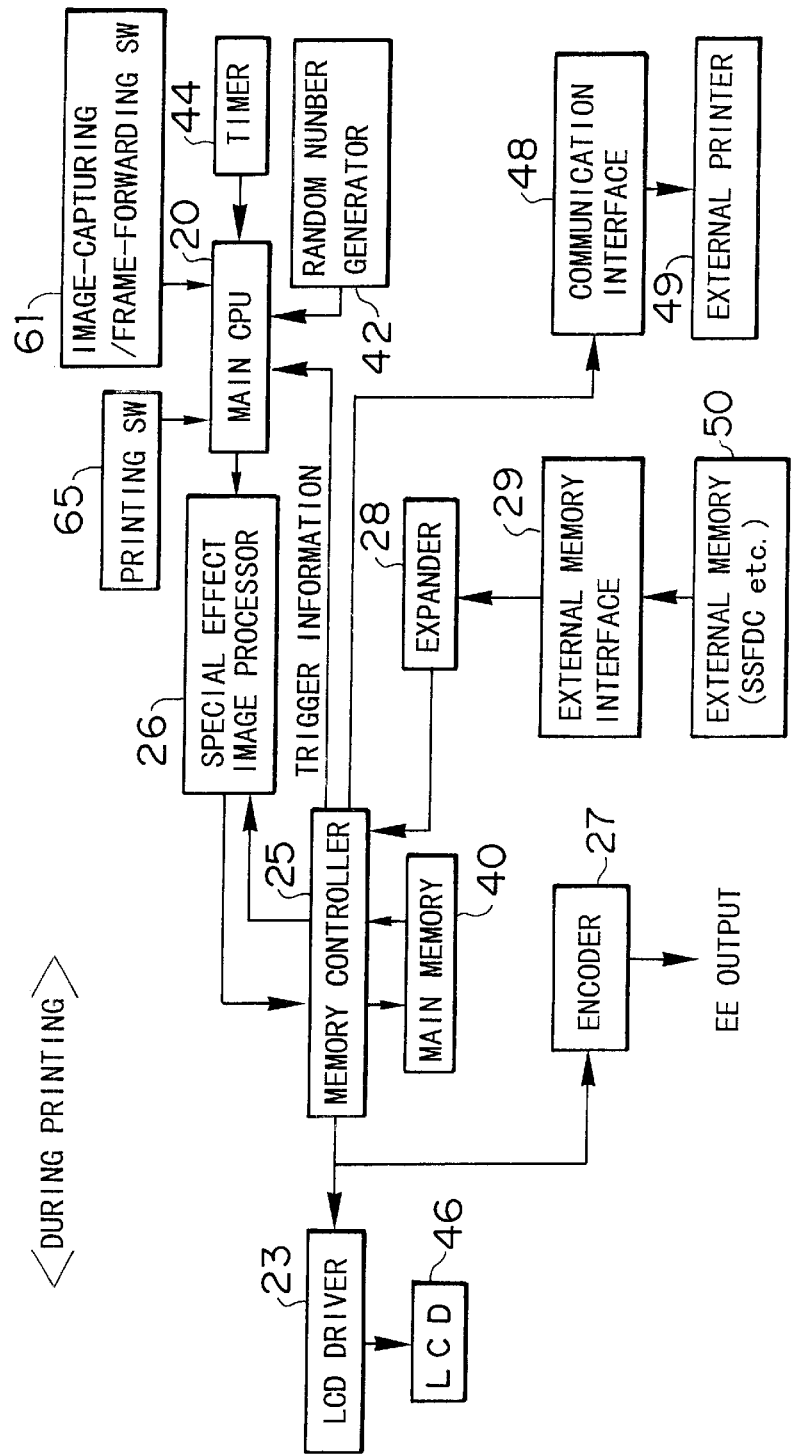

DIGITAL CAMERA FOR PROVIDING RANDOM SPECIAL EFFECT IMAGES AND AN IMAGE PROCESSING METHOD THEREIN

BACKGROUND OF THE INVENTION

1. Field of the Invention

The present invention relates to a digital camera and an image processing method in the digital camera, and more particularly to a digital camera and an image processing method in the digital camera for creating special effect images by performing image-processing that applies special effects to captured images.

2. Description of Related Art

In conventional image-processing, image data representing a subject image (an unaltered image) or unaltered image data obtained by a digital camera is captured into a computer, which image-processes the unaltered image data, thereby creating a special effect image data representing a special effect image by applying the special effects to the unaltered image. For example, the special effects such as deformation and soft-focus are applied to the unaltered image with the use of a variety of filters, or the unaltered image is combined with a template image, which is prepared in advance to be used as a background image. In this case, however, there is the necessity for the computer that is capable of applying the special effects to the unaltered image, and it is difficult for a user who is inexperienced in operating the computer to create the special effect image.

Recently, a digital camera has been proposed that has a function of combining the unaltered image and the template image prepared in advance. In this case, however, it is necessary to select the template image as the background image before composing the special effect image by combining the unaltered image and the template image.

Furthermore, in the above-mentioned cases, it is impossible to obtain an unexpected interesting image, since the special effects are applied to the unaltered image in accordance with the operation of the user.

SUMMARY OF THE INVENTION

The present invention has been developed in view of the above-described circumstances, and has as its object the provision of a digital camera and an image processing method in the digital camera, which make it possible to easily obtain interesting and unexpected images.

To achieve the above-mentioned object, the present invention is directed to a digital camera comprising: an imaging system for imaging a subject and converting a subject image into unaltered image data representing an unaltered image of the subject; a special effect selector provided with a random number generator generating a random number, the special effect selector selecting one special effect from a plurality of special effects in accordance with the random number; and a special effect processor for image-processing the unaltered image data under the special effect selected by the special effect selector to thereby obtain special effect image data representing a special effect image.

To achieve the above-mentioned object, the present invention is directed to an image processing method in a digital camera, comprising the steps of: imaging a subject and converting a subject image into unaltered image data representing an unaltered image of the subject upon receiving a command to image-capture; generating a random number by a random number generator; selecting one special effect from a plurality of special effects in accordance with the random number; and image-processing the unaltered image data under the selected special effect to thereby obtain special effect image data representing a special effect image.

According to the present invention, the randomly-selected special effect is applied to the unaltered image representing the subject image, and thus, it is easy to obtain the unexpected special effect image.

The unaltered image and/or the special effect image are shown on an image display. It is also possible to provide a display changeover switch such that one of the unaltered image, the special effect image and a mixed image created by mixing the unaltered image with the special effect image, can be selectively shown on the image display.

The special effect image data may be recorded into a recording medium. It is also possible to record the unaltered image data and special effect data representing the special effect applied to the unaltered image into a recording medium, when an image-capturing switch is operated or when a trigger signal is inputted from external equipment. In this case, the special effect image processor performs the image processing in accordance with the unaltered image data and the special effect data read from the recording medium.

When the special effect is selected randomly; an image-capturing switch is operated or a trigger signal is inputted from external equipment, the unaltered image data is read from the recording medium for the playback or printing.

According to the present invention, the special effect image data is recorded into the recording medium when a recording switch is turned on. When a preset time has elapsed without the recording switch being turned on, the special effect is selected randomly again. Thus, if the recording switch is not turned on, the special effect images changes randomly. Then, the user can record only a favorite special effect image by turning on the recording switch when the favorite special effect image is created and displayed.

Likewise, according to the present invention, when a printing switch is turned on, the special effect image data is sent to an external printer so as to print the special effect image on the external printer. When a preset time has elapsed without the printing switch being turned on, the special effect is selected randomly again. Thus, if the printing switch is not turned on, the special effect images changes randomly. Then, the user can print only a favorite special effect image on the external printer by turning on the printing switch when the favorite special effect image is created and displayed.

Moreover, the present invention is directed to an image processing method in a digital camera, comprising the steps of: (a) imaging a subject and converting a subject image into unaltered image data representing an unaltered image in a frame; (b) recording the unaltered image data in the frame into a recording medium; (c) repeating the steps (a)–(b) a preset number of times to thereby record the unaltered image data in the preset number of the frames; (d) reading the recorded unaltered image data in one of the preset number of the frames from the recording medium recorded in the step (c); (e) generating a random number by a random number generator; (f) selecting one special effect from a plurality of special effects in accordance with the random number; (g) image-processing the unaltered image data read in the step (d) under the special effect selected in the step (f)

to thereby obtain special effect image data representing a special effect image; (h) recording the special effect image data obtained in the step (g) into the recording medium; and (i) repeating the steps (d)–(h) for the recorded unaltered image data in the preset number of the frames.

According to the present invention, the image data of the unaltered images in a plurality of frames is recorded once into the recording medium in continuous image-capturing. After the continuous image-capturing, the special effect is selected for each frame, the image processing is performed in accordance with the selected special effect, and the special effect image data is recorded into the recording medium for the unaltered images in the plurality of frames. Thus, the special effect can be applied to each unaltered image, even if the time required for the image processing of applying the special effect to the unaltered image, and the time required for recording the special effect image data are longer than the interval of the continuous image-capturing.

Furthermore, the present invention is directed to an image processing method in a digital camera, comprising the steps of: (a) imaging a subject and converting a subject image into unaltered image data representing an unaltered image in a frame; (b) generating a random number by a random number generator; (c) selecting one special effect from a plurality of special effects in accordance with the random number; (d) recording a combination of the unaltered image data in the frame and special effect data representing the special effect selected in the step (c) into a recording medium; (e) repeating the steps (a)–(d) a preset number of times to thereby record the preset number of the combinations of the unaltered image data and the special effect data; (f) reading one of the combinations of the unaltered image data and the special effect data recorded in the step (e); (g) image-processing the unaltered image data read in the step (f) under the special effect represented by the special effect data read in the step (f) to thereby obtain special effect image data representing a special effect image; (h) recording the special effect image data obtained in the step (g) into the recording medium; and (i) repeating the steps (f)–(h) for the preset number of the combinations of the unaltered image data and the special effect data.

Thus, the special effect data as well as the unaltered image data in a plurality of frames is recorded once into the recording medium in the continuous image-capturing. After the continuous image-capturing, the image processing is performed in accordance with the selected special effect, and the special effect image data is recorded into the recording medium for the unaltered images in the plurality of frames.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 1 is a block diagram illustrating the inner structure of a digital camera according to an embodiment of the present invention;

FIG. 21 is a block diagram showing the flow of the data when the special effect is applied to the unaltered image during the printing;

DETAILED DESCRIPTION OF THE PREFERRED EMBODIMENT

Figure 2:
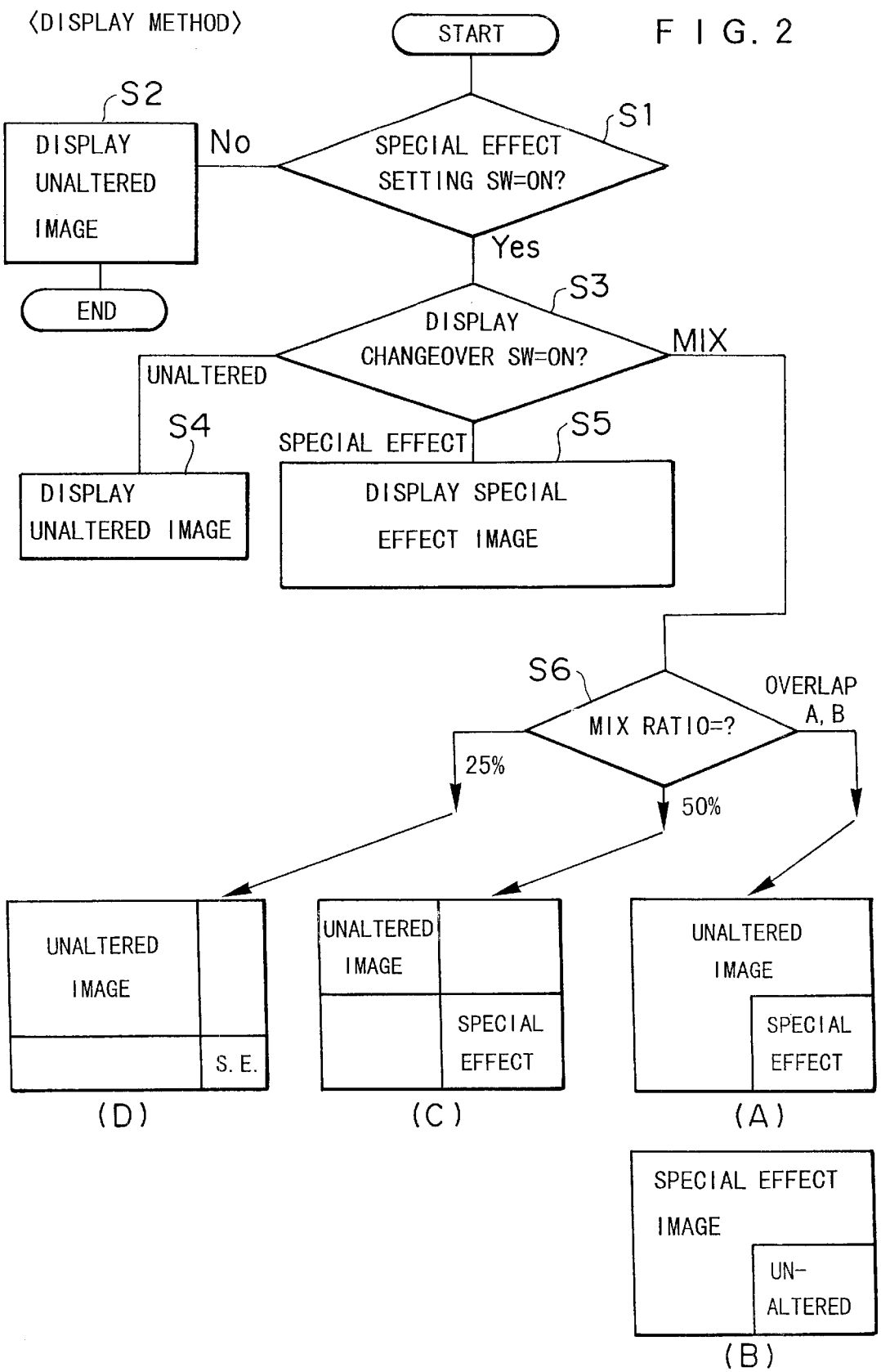
FIG. 2 is a view of assistance in explaining what is displayed on an LCD in FIG. 1 and the changeover of the display on the LCD.

This invention will be described in further detail by way of example with reference to the accompanying drawings.

FIG. 1 is a block diagram illustrating the inner structure of a digital camera according to an embodiment of this invention.

As shown in FIG. 1, the digital camera comprises a CCD imaging system 10, a main CPU 20, an auto CPU 21, a memory controller 25, a special effect image processor 26, an external memory interface 29, a main memory 40, a random number generator 42, a timer 44, a liquid crystal display (LCD) 46, a communication interface 48, an external memory 50, and a switch part 60.

The CCD imaging system 10 comprises: an imaging optical system 11 including a zoom lens 11A, an iris 11B and an optical low pass filter 11C; a CCD 12; an analog processor including a CDS cramp 13, a gain control amplifier 14, a gamma ($\gamma$) corrector 15 and a dot-sequentializer 16; and an A/D converter 17.

An image of a subject is formed on a light receiving surface of the CCD 12 through the imaging optical system 11, and each sensor in the CCD 12 converts the image into signal electric charge of which amount corresponds to the quantity of incident light. The accumulated signal electric charge is read to a shift register by a read gate pulse sent from a CCD driver (not illustrated), and the signal electric charge is sequentially read out as a voltage signal (an analog image signal) by a register transfer pulse sent from the CCD driver. A shutter drain connects to the CCD 12 through a shutter gate. Driving the shutter gate by a shutter gate pulse discharges the accumulated signal electric charge into the shutter drain. In other words, the CCD 12 has a so-called electronic shutter function of controlling the time (a shutter speed) in which the electric charge is accumulated in each sensor by the shutter gate pulse.

The analog image signal is read from the CCD 12, and sent to the CDS cramp 13. The CDS cramp 13 samples and holds the analog image signal for each pixel, and divides the analog image signal into R, G and B color signals, which are sent to the gain control amplifier 14. The gain control amplifier 14 amplifies the inputted R, G and B signals by proper gain so as to adjust their white balance. A detailed description will be given later about the white balance adjustment.

The gain control amplifier 14 sends the R, G and B signals to the gamma corrector 15. The R, G and B signals are gamma-corrected in the gamma corrector 15, and they are sent to the dot-sequentializer 16. The dot-sequentializer 16 converts the simultaneously-inputted R, G and B signals into dot-sequential signals, which are sent to the A/D converter 17. The A/D converter 17 converts the dot-sequentially-inputted R, G and B signals into digital signals. The digitized R, G and B signals are stored in the main memory 40 such as a dynamic random access memory (DRAM) through the memory controller 25.

The main CPU 20 connects to the auto CPU 21, a character generator 22, an LCD driver 23, a YC signal generator 24, the memory controller 25, the special effect image processor 26, an encoder 27, a compression/expansion processor 28, and the external memory interface 29 via a bus line 30. The main CPU 20 supervises the components in accordance with the inputs from the switch part 60, the random number generator 42, the timer 44, etc.

The auto CPU 21 performs the controls such as auto-focusing (AF) control, automatic exposure (AE) control, automatic flash control, and automatic white balance (AWB) control. The auto CPU 21 receives AF information indicating the object distance from an AF sensor 31, and receives the R, G and B digital signals through the memory controller 25. The auto CPU 21 drives an AF motor (not illustrated) through an AF motor driver 32 in accordance with the AF information from the AF sensor 31, so that a focus lens of the zoom lens 11A can move to a focus position.

The auto CPU 21 finds AE information that is an integrated value obtained by integrating the R, G and B digital signals in one frame, and AWB information that is color integrated values obtained by integrating the digital signals of each color in one frame. The auto CPU 21 sets an iris value and a shutter speed in accordance with the AE information, and drives the iris 11B by an iris motor (not illustrated) through an iris motor driver 33 so as to achieve the set iris value, and controls the electric charge accumulation time by the electronic shutter so as to achieve the set shutter speed. The auto CPU 21 sets the gains for the R, G and B signals in accordance with the AWB information, and controls each gain of the gain control amplifier 14 with an electronic variable resistor (EVR) 34.

The auto CPU 21 also controls a speed light 35. For example, judging the speed light image-capturing as being performed under a low luminance, the auto CPU 21 outputs a trigger signal to electronically flash a discharge tube 35A upon the operation of an image-capturing/frame-forwarding switch 61, which will be described later. Consequently, electric energy stored in a main condenser (not illustrated) is supplied to the discharge tube 35A, and the discharge tube 35A flashes. A light control sensor 36, which receives the reflected light from the subject, sends a signal indicating the quantity of the received light to the auto CPU 21. When the quantity of the received light reaches a predetermined one, the auto CPU 21 shuts off the electric energy to the discharge tube 35A to stop flashing. The auto CPU 21 does not only make the speed light 35 flash under the low luminance but also when a compulsory flash switch is turned on.

The character generator 22 generates character information such as the image-capturing date and a title of the image. The captured image can be applied with the characters in accordance with the character information. The LCD driver 23 drives the LCD 46 to display an unaltered image of the subject with no special effects, a special effect image created by applying a special effect to the unaltered image, or a mix image of the unaltered image and the special effect image.

On the screen of the LCD 46, the displayed images can be switched by operating a special effect setting switch 64 and a display changeover switch 68 as shown in FIG. 2. The special effect setting switch 64 is operated to select a time for applying the special effect from a printing time, a playback time and an image-recording time, and if the special effect setting switch 64 is off, no special effect is applied to the unaltered image. When the special effect setting switch 64 is off at SI in FIG. 2, the unaltered image is displayed on the LCD 46 (S2).

On the other hand, when the special effect setting switch 64 is not off at S1, the displayed images on the LCD 46 are changed in accordance with the operation of the display changeover switch 68 (S3). Specifically, when the display changeover switch 68 is switched to the unaltered image, the unaltered image is displayed on the LCD 46 (S4). If the display changeover switch 68 is switched to the special effect image, the special effect image is displayed on the LCD 46 (S5).

If the display changeover switch 68 is switched to an overlapping image A or B, in which the unaltered image is overlapped with the special effect image, the overlapping image A or B is displayed on the LCD 46. If the display changeover switch 68 is switched to a mix image C in which the unaltered image is mixed with 50% of the special effect image or a mix image D in which the unaltered image is mixed with 25% of the special effect image, the mix image C or D is displayed on the LCD 46. The screen of the LCD 46 is also used to settle the special effect, and this will be described later in detail.

The YC signal generator 24 generates a luminance signal Y and a chroma signal C (color difference signals B–Y and R–Y) from the inputted R, G and B signals. The encoder 27 generates an NTSC or PAL color composite video signal in accordance with the inputted luminance signal Y and the color difference signals B–Y, R–Y. Then, the encoder 27 outputs the color composite video signal to a video output terminal (not illustrated).

The special effect image processor 26 applies the special effect to the unaltered image to create the special effect image. The special effect image processor 26 contains image data representing a plurality of template images being background for the unaltered image. The special effect image processor 26 also has a plurality of image processing filters, which provide the special effects (deformation, soft-focus, etc.). If one of the special effects is selected intentionally or randomly in accordance with the later-described special effect setting, unaltered image data representing the unaltered image and template image data of the selected template image are combined, or the unaltered image data is altered under the selected special effect procedure. Thus, the special effect image processor 26 produces special effect image data representing the special effect image created by applying the special effect to the unaltered image.

The compression/expansion processor 28 compresses uncompressed data to compressed data or expands the compressed data to the uncompressed data. To compress and record the image data, the compression/expansion processor 28 compresses the luminance signals Y and the chroma signals C of one frame, which are generated by the YC signal generator 24, in a predetermined format. Then, the compressed image data is recorded in the external memory 50 such as a smart medium or a solid-state floppy disk card (SSFDC) through the external memory interface 29. To read the compressed image data from the external memory 50 through the external memory interface 29, the compression/expansion processor 28 expands the read compressed data to the uncompressed data, and stores the uncompressed data in the main memory 40 through the memory controller 25.

The main CPU 20 connects to the random number generator 42 and the timer 44. The random number generator 42 generates and outputs a random number for selecting the special effect randomly, and the timer 44 measures time elapsing since a certain special effect is set.

The communication interface 48 connects to external equipment such as an external printer, a karaoke (an act of singing along to a music video) machine and a game machine. The image data can be transmitted between the external equipment and the digital camera through the communication interface 48. The digital camera can also receive an external trigger signal for image-capturing from the external equipment.

The switch part 60 comprises the image-capturing/frame-forwarding switch 61, a mode switch 62, a file format switch 63, the special effect setting switch 64, a printing switch 65, a settling/recording switch 66, a special-effect/degree selecting dial 67, and the display changeover switch 68.

The image-capturing/frame-forwarding switch 61 includes a switch SW1 that is turned on by half-pressing the image-capturing/frame-forwarding switch 61, and a switch SW2 that is turned on by full-pressing the image-capturing/frame-forwarding switch 61. The mode switch 62 is operated to select a mode from a printing mode, a playback mode, an image-recording mode, and a power off mode of the digital camera. The file format switch 63 is operated to select a format of an image file for recording. The special effect setting switch 64 is operated to select a special effect setting time from the printing time, the playback time, and the image-recording time, or the non-setting (off). A detailed description will be given later of the printing switch 65, the settling/recording switch 66, the special-effect/degree selecting dial 67, etc.

Figure 3:
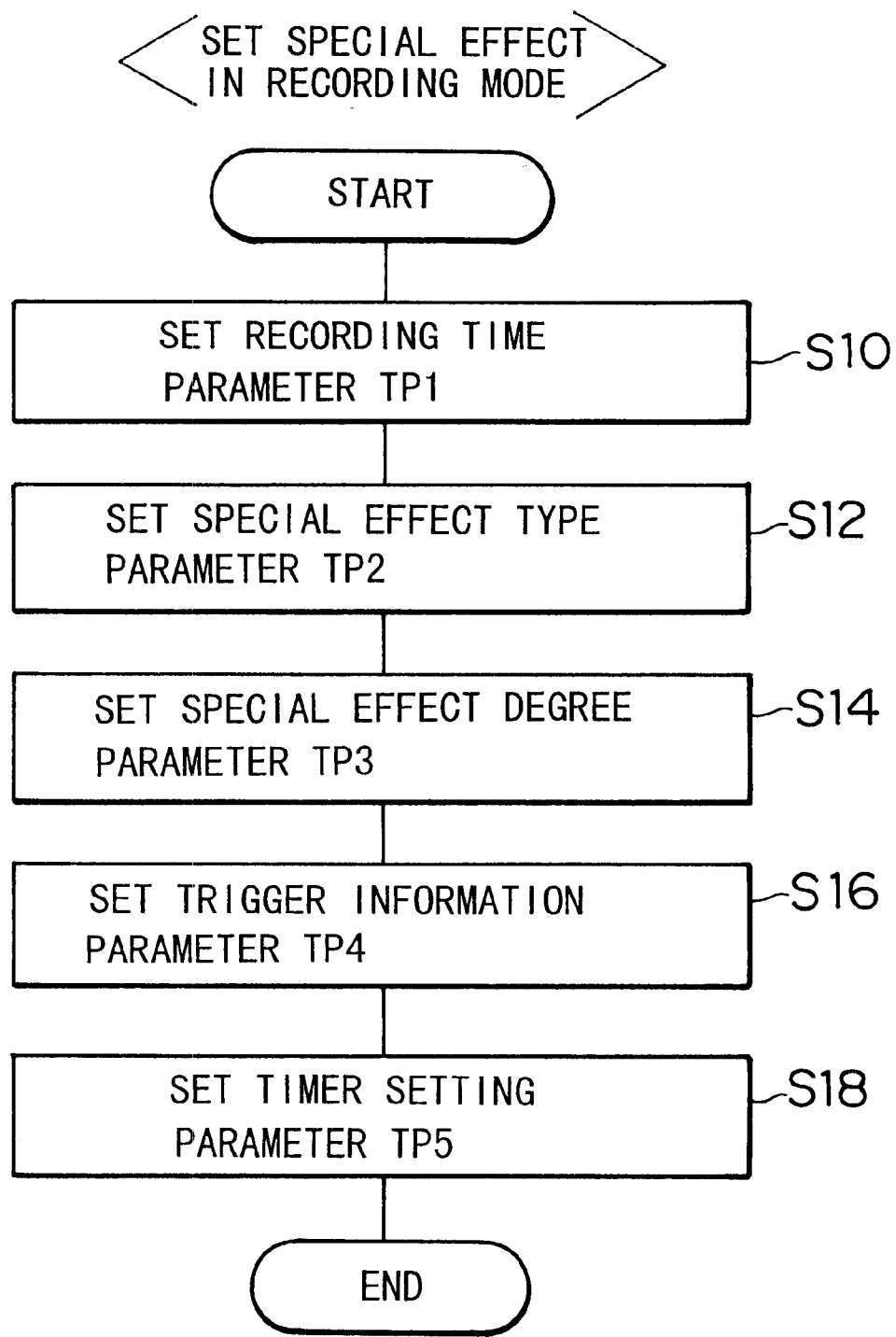
FIG. 3 is a view of assistance in explaining a procedure of setting the special effect in a recording mode.
Figure 4:
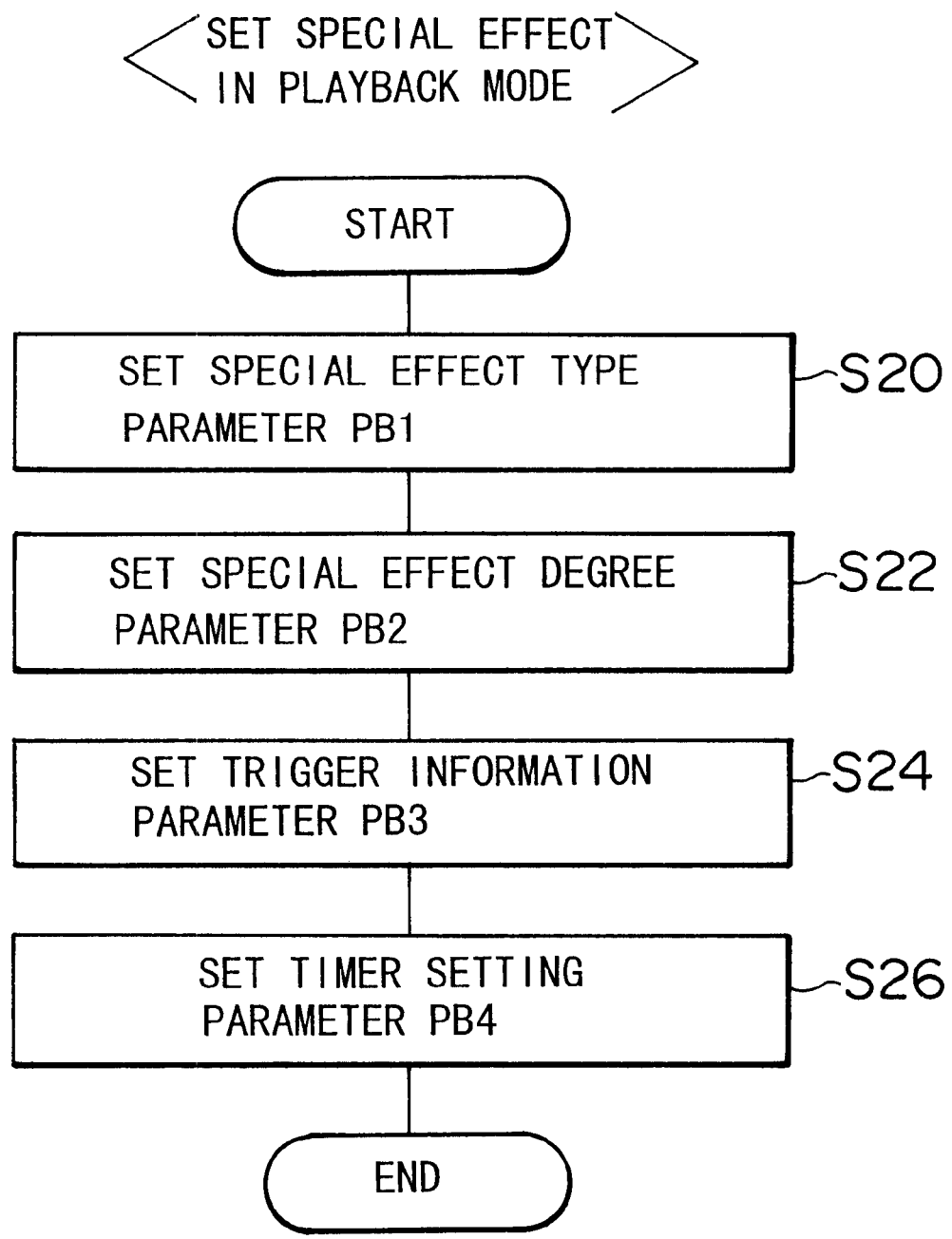
FIG. 4 is a view of assistance in explaining a procedure of setting the special effect in a playback mode.
Figure 5:
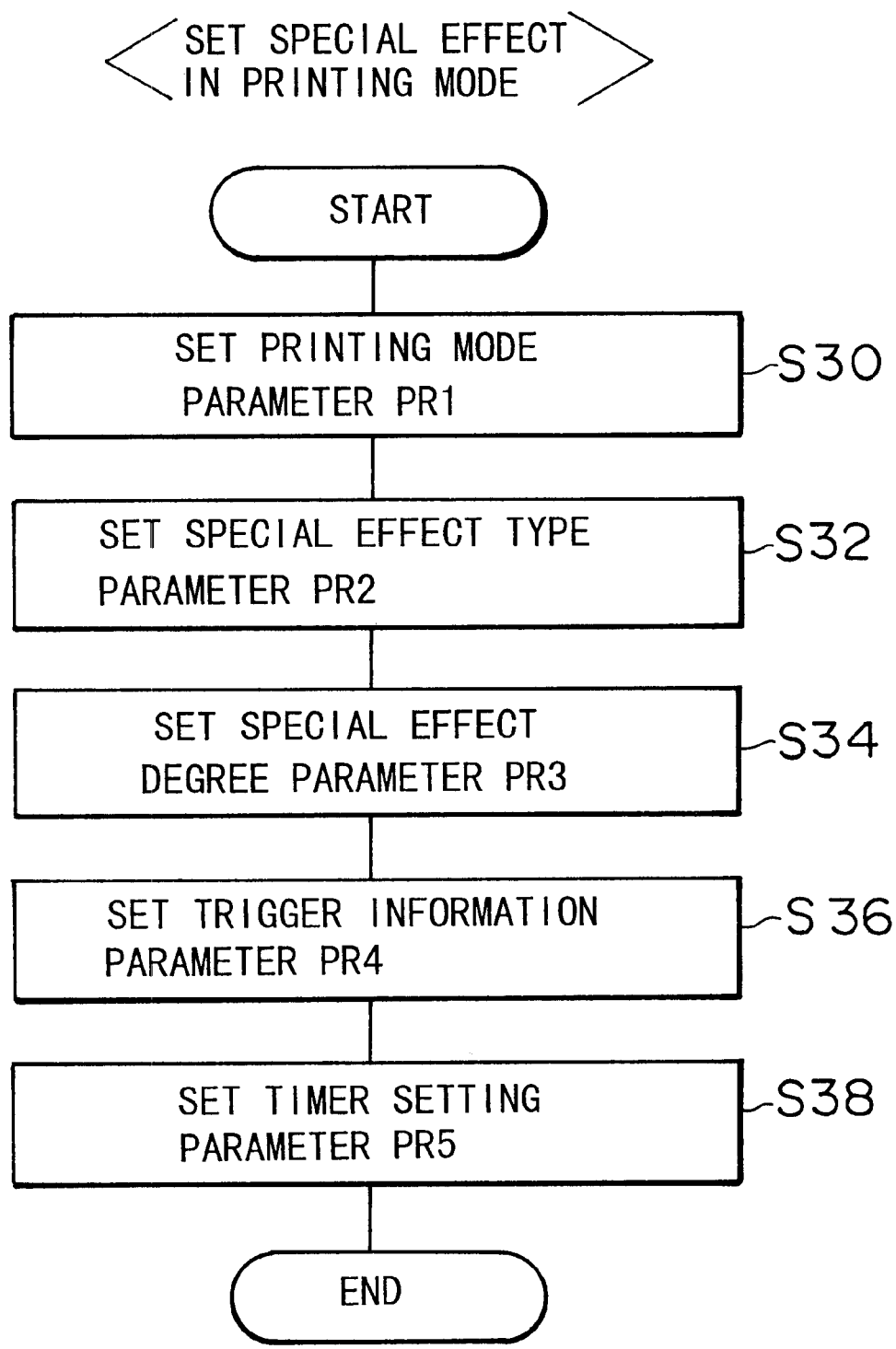
FIG. 5 is a view of assistance in explaining a procedure of setting the special effect in a printing mode.

A description will hereunder be given of the procedure for setting the special effect with reference to FIGS. 3–5.

If the special effect setting switch 64 is operated to select the setting of the special effect in the image-recording time, the special effect is applied to the unaltered image upon the image-capturing. The special effect is set in a procedure shown in FIG. 3. As shown in FIG. 3, a parameter TP1 for a recording time is settled (S10). TP1 is a parameter for setting whether to record the image data upon capturing of the image data or record the image data after enabling the user to confirm the captured image on a preview screen. For instance, the information in TABLE 1 is shown on the screen of the LCD 46.

TABLE 1

| TP1 | Recording time |
|---|---|
| 0 | Record the image data upon the image-capturing |
| 1 | Record the image data after confirming the image on a preview screen |

The user operates the special-effect/degree selecting dial 67 to select TP1=0 or 1 on the screen of the LCD 46. When the settling/recording switch 66 is turned on, TP1 is settled and the procedure goes to S12.

At S12, a parameter TP2 for a special effect type is settled. TP2 is a parameter for setting intentionally or randomly the type of the special effect. For instance, the information in TABLE 2 is shown on the screen of the LCD 46.

TABLE 2

| TP2 (PB1) (PR2) | Type of special effect |
|---|---|
| 0 | Random |
| 1 | Sacred lot |
| 2 | Image-capturing place |
| 3 | Karaoke or game |
| 4 | Lean or fat |
| 5 | Morphing |
| 6 | Soft-focus |
| 7 | Blur |
| 8 | Deformation |
| 9 | Fair-complexioned or dark-complexioned |

The user operates the special-effect/degree selecting dial 67 to select one of TP2=0~9 on the screen of the LCD 46. When the settling/recording switch 66 is turned on, TP2 is settled. If "Random" (TP2=0) in TABLE 2 is selected, one of the special effects of TP2=1~9 is selected randomly.

TP2=1~3 indicate groups of template images. If TP2=1, a group of template images representing sacred lots are selected. If TP2=2, a group of template images representing image-capturing places are selected. If TP2=3, the images transmitted from the external equipment such as the karaoke machine or the game machine through the communication interface 48 are selected as template images.

Figure 6:
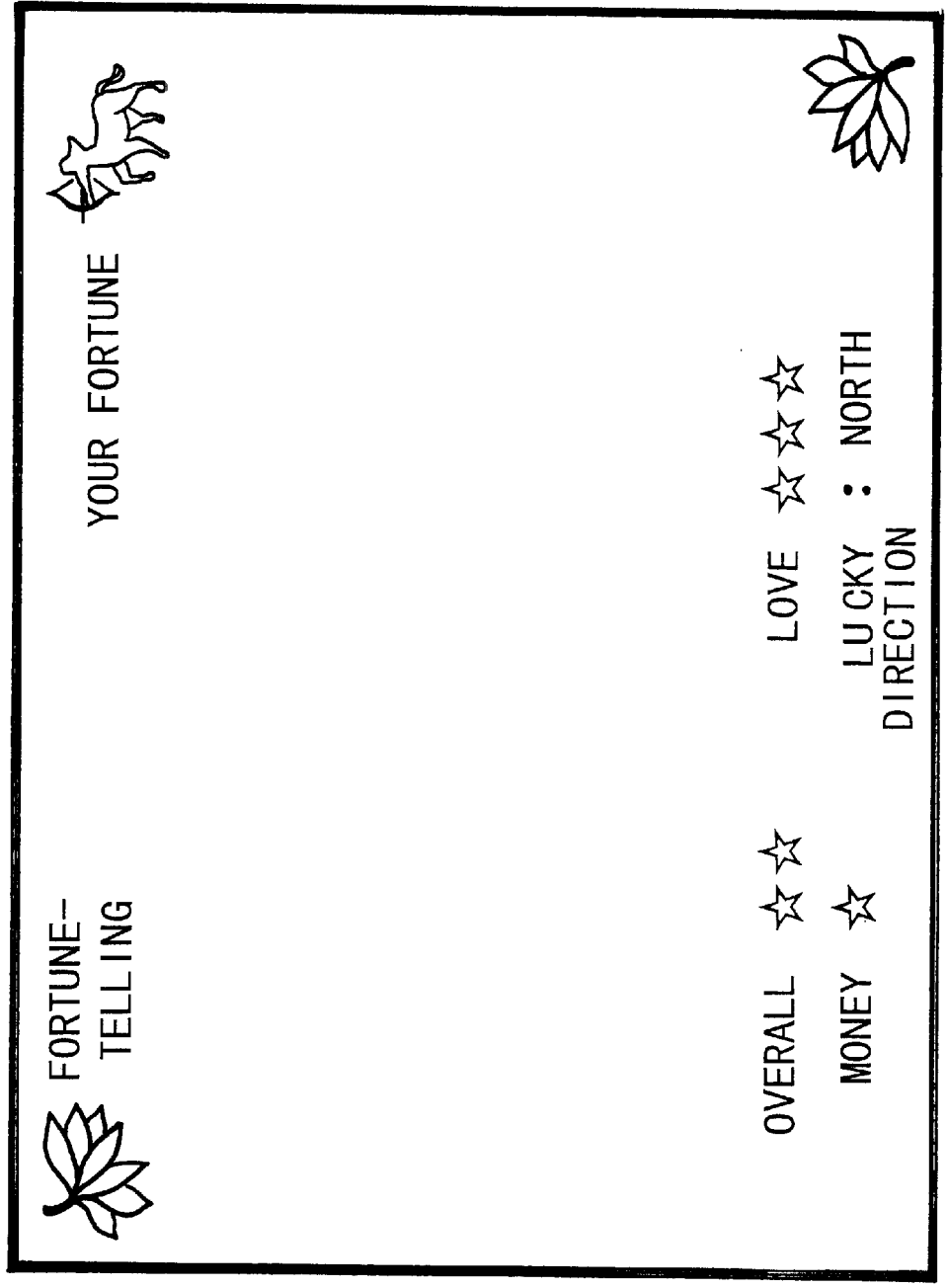
FIG. 6 is a view showing an example of a template image representing a sacred lot.

FIG. 6 shows an example of one template image among the group of template images representing the sacred lots. Since the template image in FIG. 6 is composed of an area that is common to all the template images, and variable areas such as the number of stars and a lucky direction, an image for the common area and images for the variable areas are stored separately. Then, the images for the variable areas are selected and combined with the image for the common area.

Figure 7:
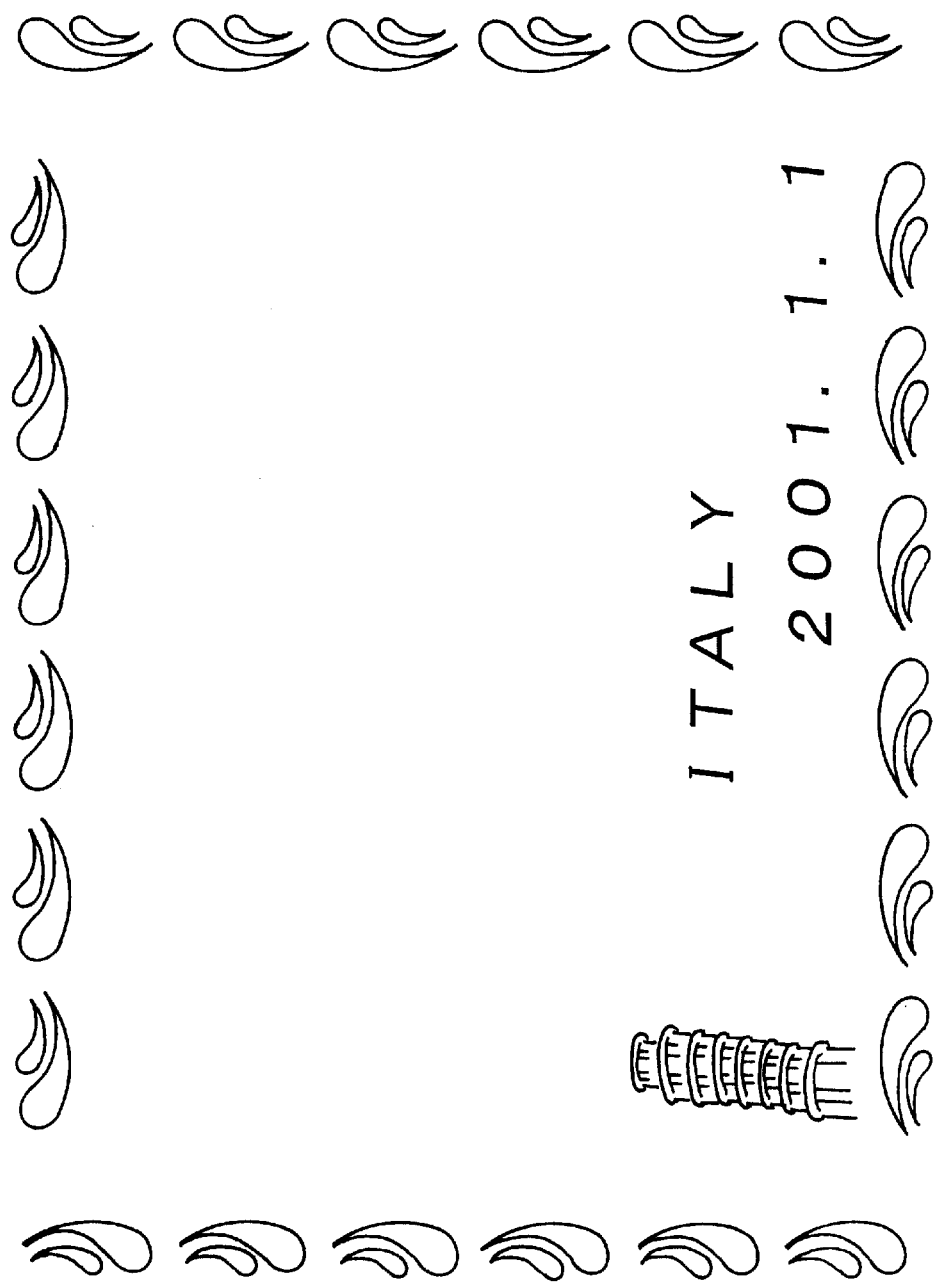
FIG. 7 is a view showing an example of a template image representing an image-capturing place.
Figure 8:
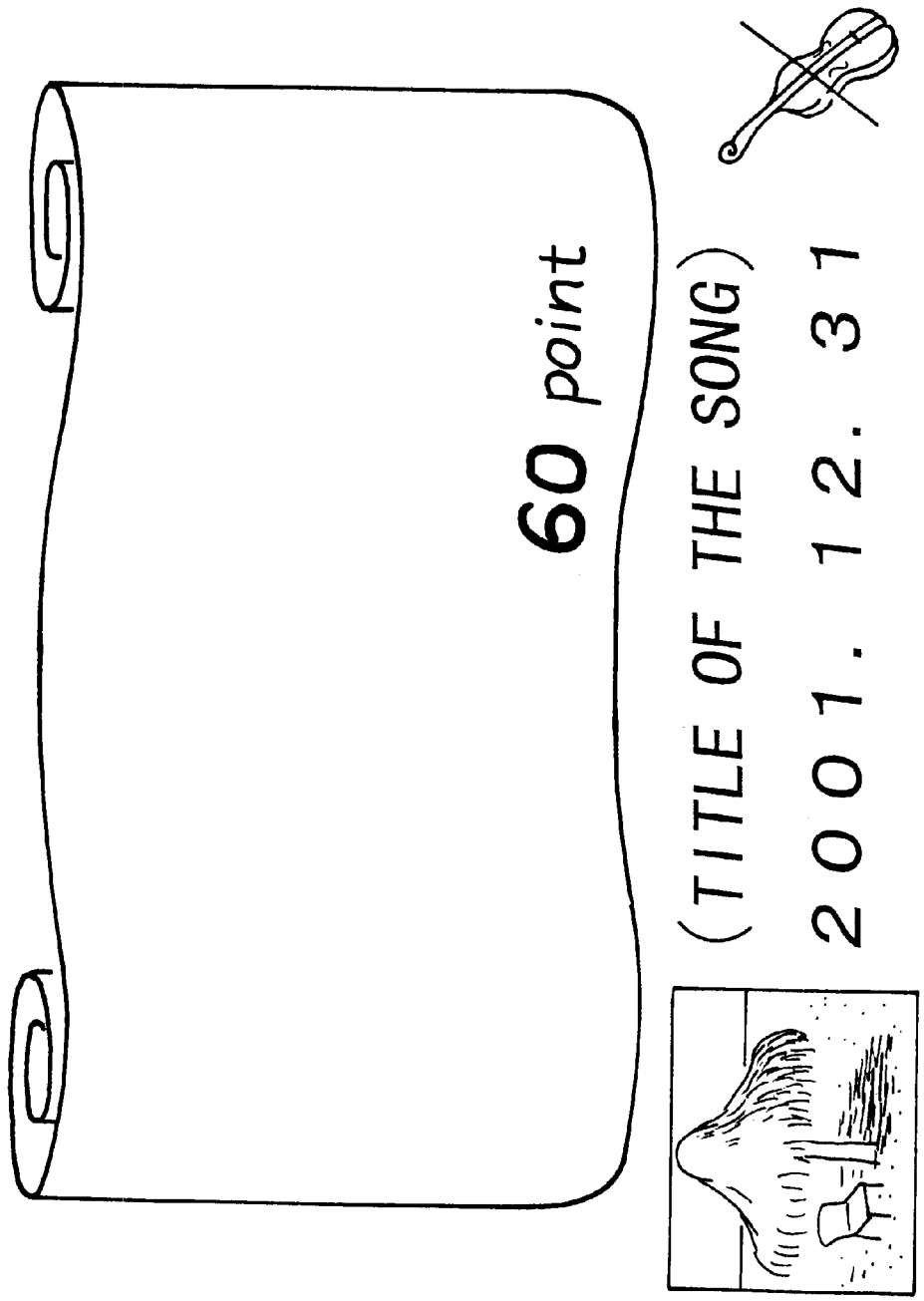
FIG. 8 is a view showing an example of an image on a karaoke machine, which is captured as a template image.
Figure 9:
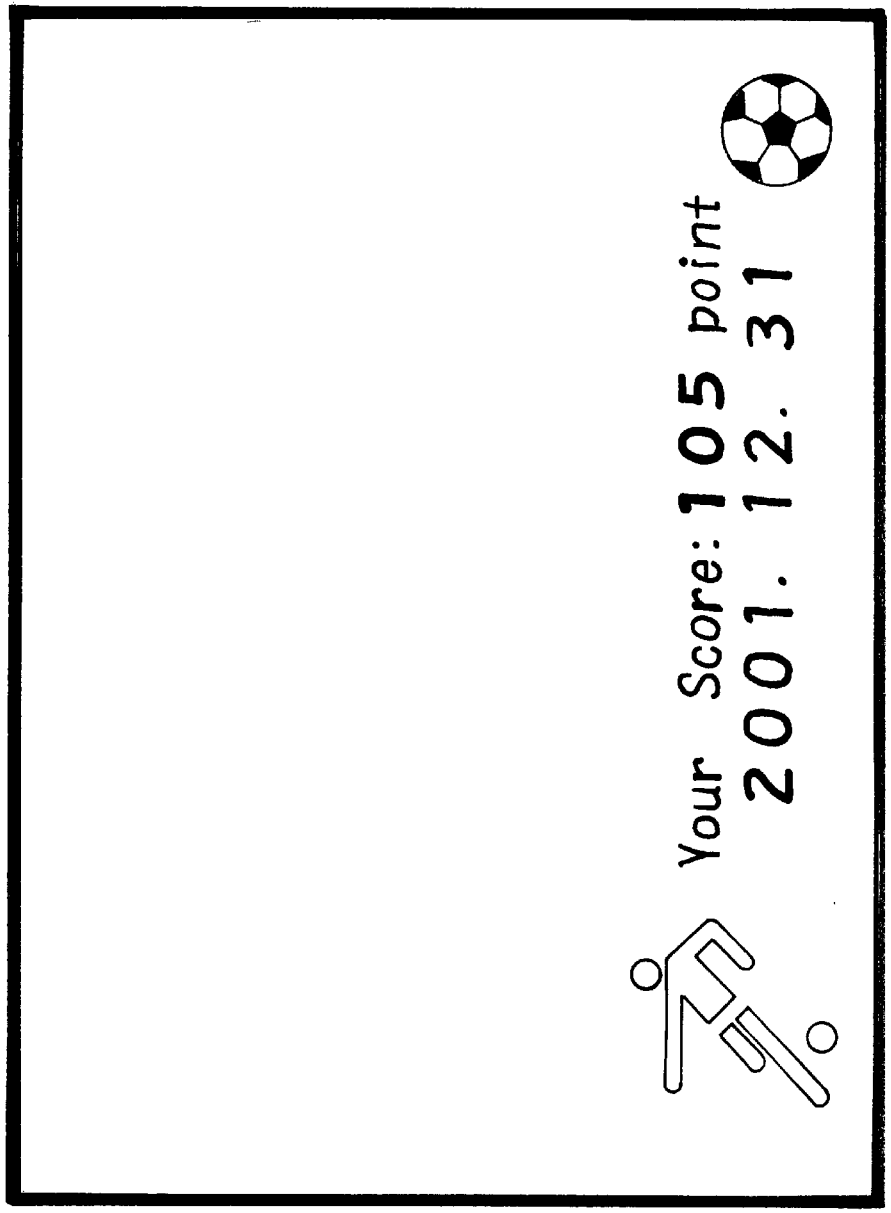
FIG. 9 is a view showing an example of an image on a game machine, which is captured as a template image.

FIG. 7 shows an example of one template image among the group of template images representing the image-capturing places. FIG. 8 shows an example of an image that is sent from the karaoke machine and captured as a template image. FIG. 9 shows an example of an image that is sent from the game machine and captured as a template image. The image-capturing date is combined with the template images shown in FIGS. 7–9.

A description will be given later about a method of selecting one template image from the selected group of the template images.

Figure 10:
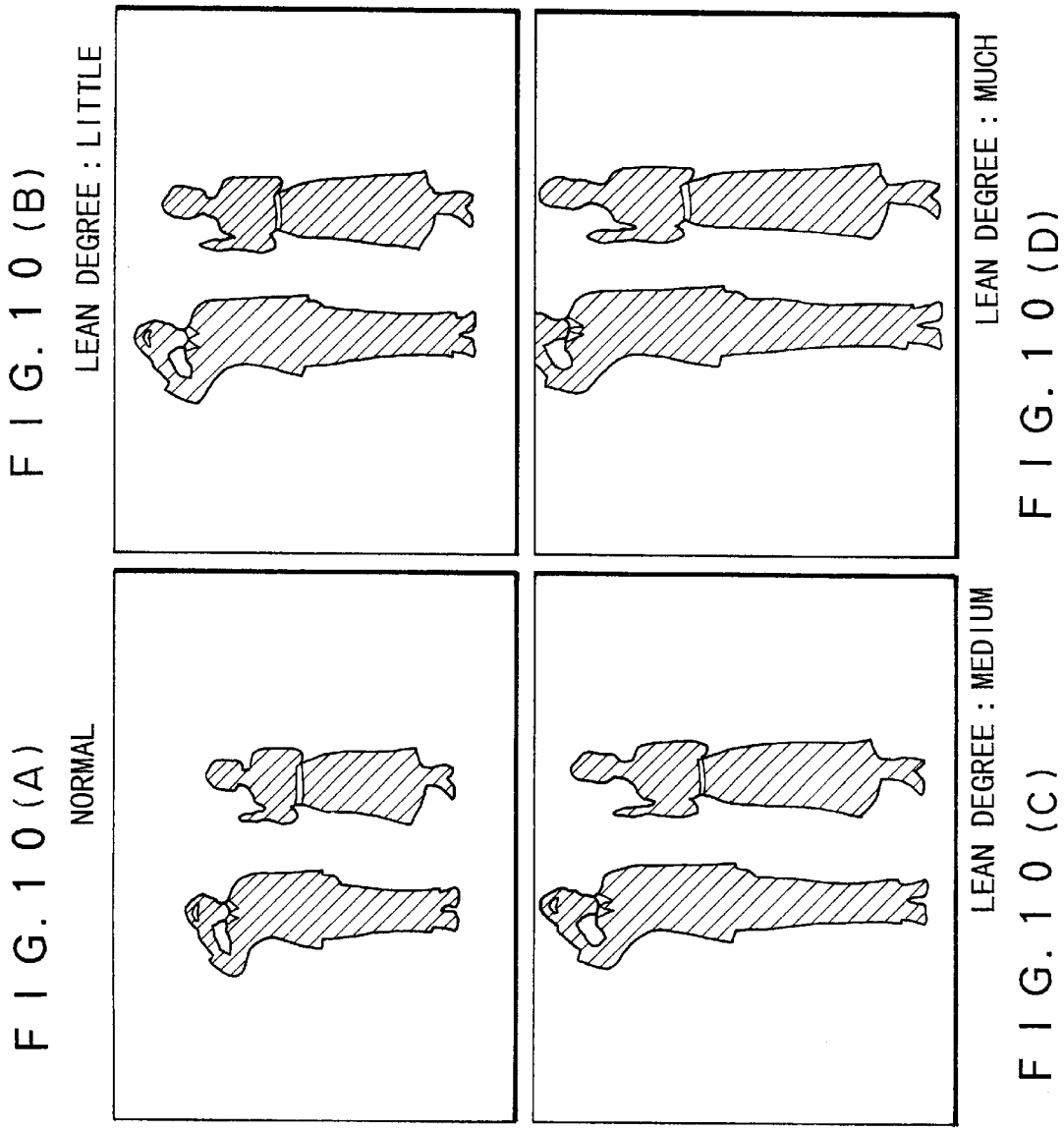
FIGS. 10(A), 10(B), 10(C) and 10(D) are views of assistance in explaining special effect images that are made lean.
Figure 11:
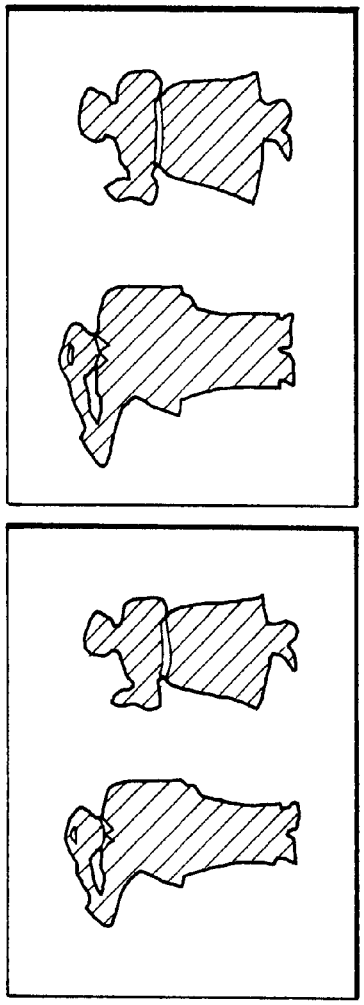
FIGS. 11(A), 11(B), 11(C) and 11(D) are views of assistance in explaining special effect images that are made fat.

On the other hand, TP2=4~5 indicate the types of filter (distorting) operations for applying the special effect to the unaltered image. If TP2=4 (lean or fat), one of the following distorting operations is selected: the special effect (lean) images are created by increasing the pixels of the unaltered image (normal) in FIG. 10(A) in the vertical direction as shown in FIGS. 10(B)–(D), and the special effect (fat) images are created by increasing the pixels of the unaltered image (normal) in FIG. 11(A) in the horizontal direction as shown in FIGS. 11(B)–(D). If TP2=5, the filter operation is selected so as to perform the morphing for the unaltered image. If TP2=6, the filter operation is selected so as to perform the soft-focusing for the unaltered image. If TP2=8, the filter operation is selected so as to perform the deformation for the unaltered image. If TP2=9, the filter operation is selected so as to make the unaltered image fair-complexioned or dark-complexioned, by changing the AE level.

After TP2 is settled as stated above, the procedure goes to S14 in FIG. 3. At S14, a parameter TP3 for special effect degree is settled. TP3 is a parameter for setting intentionally or randomly the degree of the special effect. For instance, the information in TABLE 3 is shown on the screen of the LCD 46.

TABLE 3

| TP3 (PB2) (PR3) | Degree of special effect |
|---|---|
| 0 | Random |
| 1 | Much |
| 2 | Medium |
| 3 | Little |

The user operates the special-effect/degree selecting dial 67 to select one of TP3=0~3 on the screen of the LCD 46. When the settling/recording switch 66 is turned on, TP3 is settled. If "Random" (TP3=0) in TABLE 3 is selected, one of the special effect degrees of TP3=1~3 is selected randomly.

TP3 is used for the types of the special effects of TP2= 4~9, setting the degree of the filter (distorting) operation selected by TP2. For example, if TP2=4 (lean or fat) and TP3=3 are selected, the unaltered image (normal) in FIG. 10(A) or 11(A) is processed to become a little lean or fat as shown in FIG. 10(B) or FIG. 11(B). If TP3=2 is selected, the unaltered image is processed to become medium lean or fat as shown in FIG. 10(C) or FIG. 11(C). If TP3=1 is selected, the unaltered image is processed to become much lean or fat as shown in FIG. 10(D) or 11(D).

After TP3 is stated above, the procedure goes to S16 in FIG. 3. At S16, a parameter TP4 for trigger information is settled. TP4 is a parameter for setting intentionally or randomly which information is used as the trigger information for selecting one template image from the selected group of the template images. For instance, the information in TABLE 4 is shown on the screen of the LCD 46.

TABLE 4

| TP4 (PB3) (PR4) | Trigger information |
|---|---|
| 0 | Random |
| 1 | RGB |
| 2 | YC |
| 3 | Lens F (iris value) |
| 4 | Lens f (focal length) |
| 5 | Shutter speed |
| 6 | Quantity of flash light |
| 7 | AE information |
| 8 | AF information |
| 9 | AWB information |
| 10 | Karaoke or game |

The user operates the special-effect/degree selecting dial 67 to select one of TP4=0~9 on the screen of the LCD 46. When the settling/recording switch 66 is turned on, TP4 is settled. If "Random" (TP4=0) in TABLE 4 is selected, one piece of the trigger information of TP4=1~10 is selected randomly.

TP4 is used for the types of the special effects of TP2= 1~3, setting which information is used to select one template image from the group of the template images selected by TP2.

Specifically, TP4=1~2 indicate the cases wherein the unaltered image data of the unaltered image to be combined with the template image is regarded as the trigger information. If TP4=1, one template image is selected from the selected group of the template images in accordance with the RGB data of the unaltered image. For example, a value indicating the characteristics of the unaltered image is calculated on the basis of the maximum and minimum R, the maximum and minimum G, and the maximum and minimum B of the RGB data. Then, one template image is selected form the selected group of the template images in accordance with the calculated value. Likewise, if TP4=2, a value indicating the characteristics of the unaltered image is calculated on the basis of the luminance signal Y and the chroma signal C of the unaltered image. Then, one template image is selected form the selected group of the template images in accordance with the calculated value.

TP4=3~6 indicate the cases wherein the camera information in the image-capturing is regarded as the trigger information. If TP4=3, one template image is selected from the selected group of the template images in accordance with the iris value F in the image-capturing. If TP4=4, one template image is selected from the selected group of the template images in accordance with the focal length f of the zoom lens 11A in the image-capturing. If TP4=5, one template image is selected from the selected group of the template images in accordance with the shutter speed in the image-capturing. If TP4=6, one template image is selected from the selected group of the template images in accordance with the quantity of flash light in the image-capturing.

TP4=7~9 indicate the cases wherein the camera sensing information in the image-capturing is regarded as the trigger information. If TP4=7, one template image is selected from the selected group of the template images in accordance with the AE information relating to the brightness of the subject. If TP4=8, one template image is selected from the selected group of the template images in accordance with the AF information relating to the object distance. If TP4=9, one template image is selected from the selected group of the template images in accordance with the AWB information relating to the color temperature of the subject.

TP4=10 indicates the case wherein a score on the external equipment such as the karaoke machine or the game machine, which is transmitted through the communication interface 48, is regarded as the trigger information. If TP4=10, one template image is selected from the selected group of the template images in accordance with the score on the karaoke machine or the game machine.

After TP4 is settled as stated above, the procedure goes to S18 in FIG. 3. At S18, a parameter TP5 for timer setting is settled. TP5 is a parameter for setting whether to reselect the special effect, which is set by TP2~TP4, at regular intervals (by the timer). For instance, the information in TABLE 5 is shown on the screen of the LCD 46.

TABLE 5

| TP5 (PB4) (PR5) | Timer setting |
|---|---|
| 0 | Not reselecting by timer |
| 1 | Reselecting by timer |

The user operates the special-effect/degree selecting dial 67 to select TP5=0 or 1 on the screen of the LCD 46. When the settling/recording switch 66 is turned on, TP5 is settled and the setting of the special effect in the image-recording mode is completed. If TP5=0, the special effect selected by TP2~TP4 is not changed with passage of time. On the other hand, if TP5=1, the special effect is reset by TP2~TP4 every time the timer 44 detects the passage of a preset period after a certain special effect is selected.

The special effect can be set and applied to the unaltered image not only in the image-recording mode in FIG. 3, but in the playback mode and the printing mode.

Specifically, if the special effect setting switch 64 is operated to select the setting of the special effect in the playback mode, the special effect is applied to a reproduced unaltered image. In this case, the special effect is set in a procedure in FIG. 4. As shown in FIG. 4, a parameter PB1 for the special effect type is settled (S20). PB1 is settled in the same manner as S12 in FIG. 3 (see TABLE 2). A settling of a parameter PB2 for the special effect degree at S22, a settling of a parameter PB3 for the trigger information at S24, and a settling of a parameter PB4 for the timer setting at S26 are performed in the same manner as S14, S16, and S18, respectively, in FIG. 3 (see TABLES 3, 4 and 5).

If the special effect setting switch 64 is operated to select the setting of the special effect in the printing mode, the special effect is applied to the unaltered image that is read for printing. In this case, the special effect is set in a procedure in FIG. 5. As shown in FIG. 5, a parameter PR1 for setting a printing mode is set (S30). PR1 is a parameter for setting whether to print images one by one by manually operating the printing switch 65 while the user looks at the images on the preview screen or automatically print the images sequentially. For instance, the information in TABLE 6 is shown on the screen of the LCD 46.

TABLE 6

| PR1 | Printing mode |
|---|---|
| 0 | Manual printing mode |
| 1 | Automatic printing mode |

The user operates the special-effect/degree selecting dial 67 to select PR1=0 or 1 on the screen of the LCD 46. When the settling/recording switch 66 is turned on, PR1 is settled and the procedure goes to S32.

A settling of a parameter PR2 for the special effect type at S32, a settling of a parameter PR3 for the special effect degree at S34, a settling of a parameter PR4 for the trigger information at S36, and a settling of a parameter PR5 for the timer setting at S38 are performed in the same manner as S12, S14, S16, and S18, respectively, in FIG. 3 (see TABLES 2, 3, 4 and 5).

Figure 12:
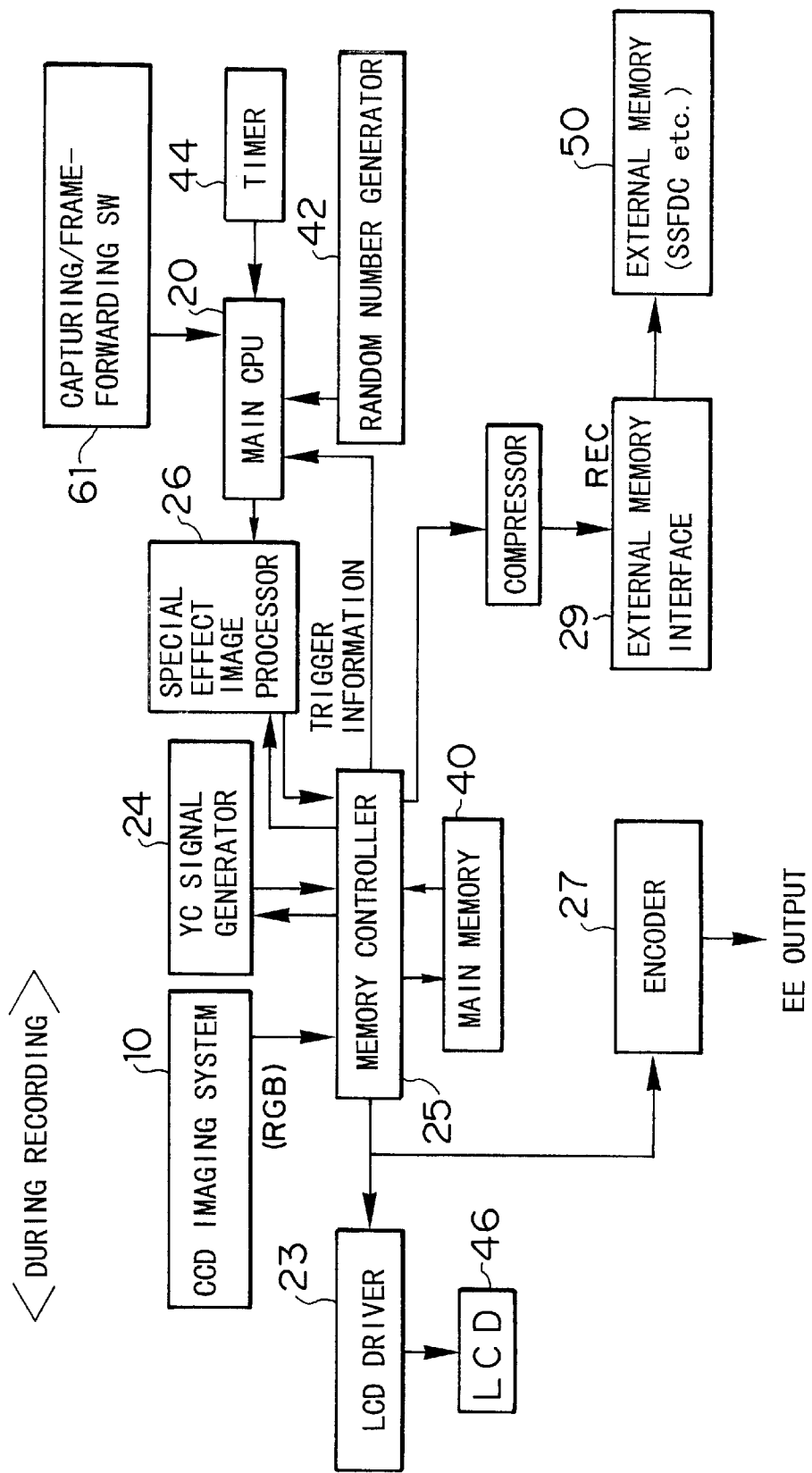
FIG. 12 is a block diagram showing the flow of the data when the special effect is applied to the unaltered image during the image-recording.
Figure 13:
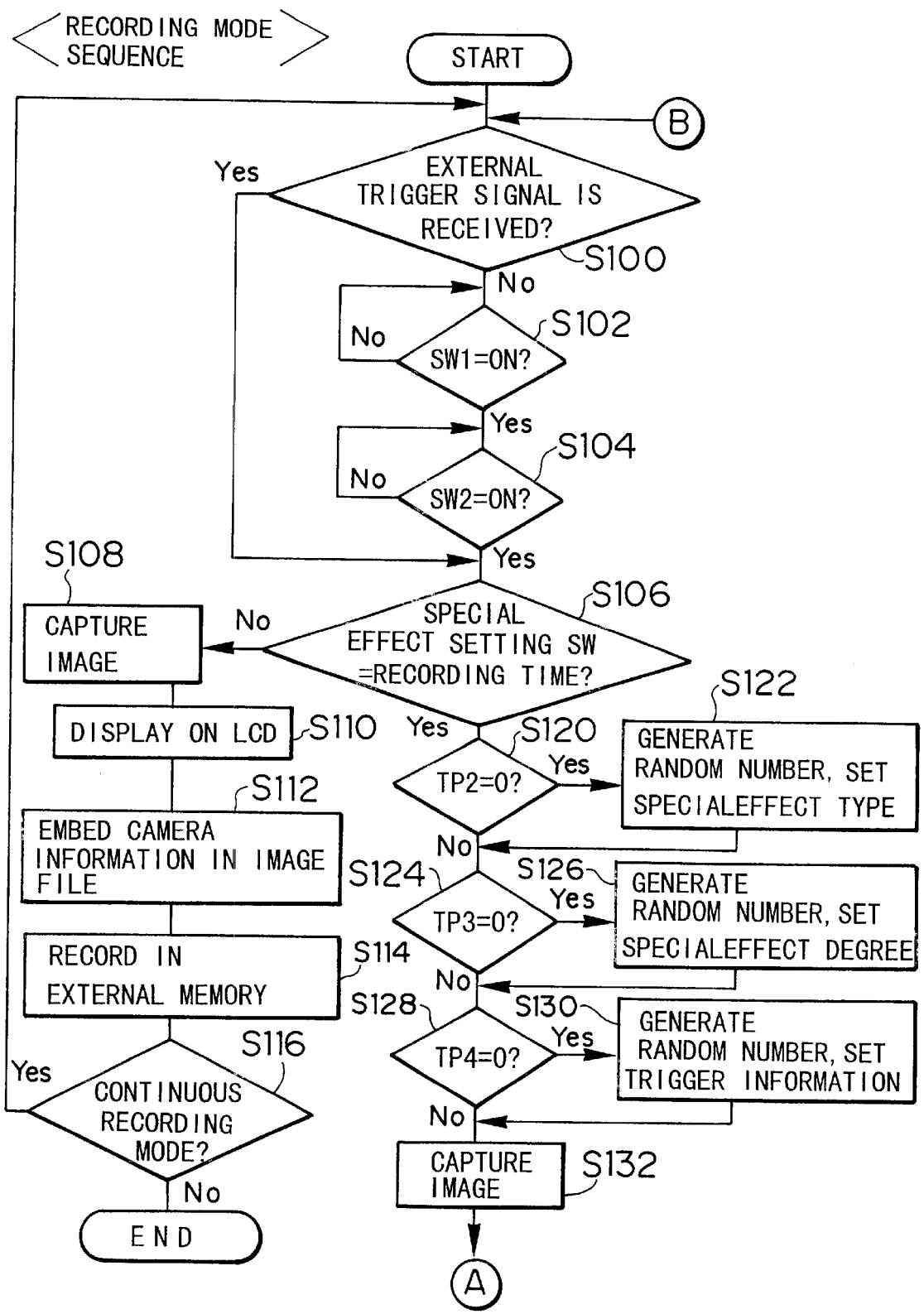
FIG. 13 is a flow chart showing an image-recording mode sequence of applying the special effect to the unaltered image during the image-recording.
Figure 14:
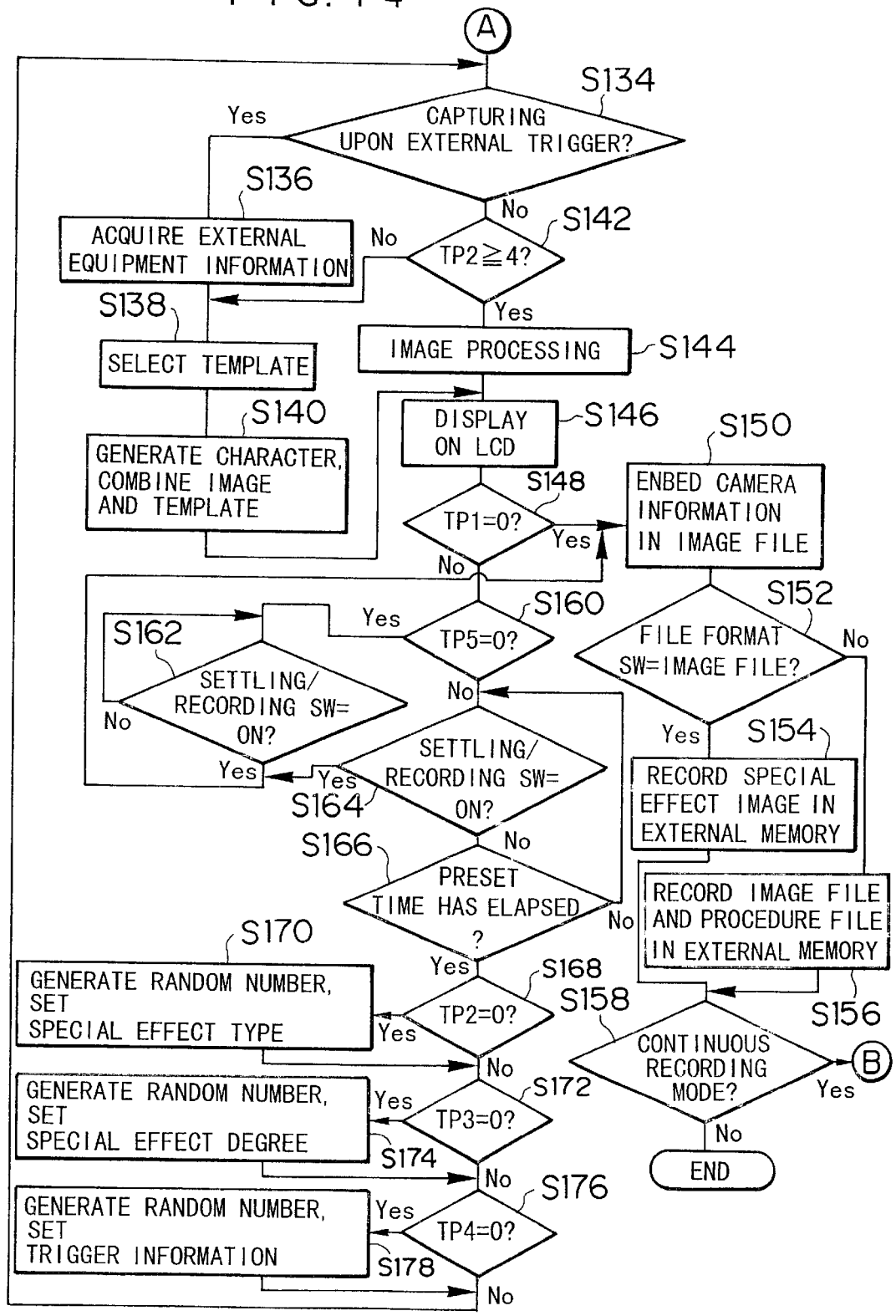
FIG. 14 is a flow chart following the flow in FIG. 13.

A description will hereunder be given of the procedure for applying the special effect to the unaltered image during the image-recording with reference to FIGS. 12–14.

FIG. 12 is a block diagram showing the flow of the data when the special effect is applied to the unaltered image during the image-recording. In FIG. 12, parts similar to those described with reference to FIG. 1 are denoted by the same reference numerals. FIGS. 13 and 14 are flow charts showing the procedure of the image-recording mode sequence.

The image-recording mode sequence starts when the image-recording mode is selected by operating the mode switch 62. First, as shown in FIG. 13, it is judged whether the external trigger signal from the external equipment is received or not (S100), and whether the switches SW1 & SW2 of the image-capturing/frame-forwarding switch 61 are turned on or not (S102 & S104). If the receiving of the external trigger signal or the tuned-on of the switches SW1 & SW2 is detected, it is judged whether the special effect setting switch 64 is set to the setting of the special effect in the image-recording time or not (S106).

If the special effect setting switch 64 is not set to the setting of the special effects in the image-recording time, the image-recording starts immediately and the subject image is captured (S108). The image data of one frame, which is obtained by the CCD imaging system 10, is stored in the main memory 40. Then, the LCD driver 23 is driven in accordance with the image data stored in the main memory 40 to display the unaltered image representing the subject image on the LCD 46 (S110). Then, the camera information in the image-capturing is embedded in the image file (S112). The image data is compressed by the compression/expansion processor 28, and the compressed image data is recorded in the external memory 50 through the external memory interface 29 (S114). The uncompressed image data may also be recorded in the external memory 50.

Then, it is judged whether the image-recording mode is the continuous recording mode or not (S116). If the image-recording mode is not the continuous recording mode (in other words, the image-recording mode is a single recording mode), the image-recording mode sequence is completed. If the image-recording mode is the continuous recording mode, the procedure returns to S100. The single recording mode, the continuous recording mode, etc. can be set on the screen of the LCD 46.

On the other hand, if the special effect setting switch 64 is set to the setting of the special effect in the image-recording time at S106, what special effect is applied to the unaltered image is set at S120–S130.

Specifically, whether the special effect type parameter TP2 is 0 or not is judged at S120. If TP2=0, the random number generator 42 generates a random number within 1 to 9, and the special effect type is set by the random number (S122, see TABLE 2). If TP2≠0, the special effect type is set by TP2 other than 0. When the communication interface 48 does not connect to the external equipment such as the karaoke machine or the game machine, the random number other than 3 is generated if TP2=0, or resettling of TP2 is required if TP2=3.

Then, whether the special effect degree parameter TP3 is 0 or not is judged at S124. If TP3=0, the random number generator 42 generates a random number within 1 to 3, and the special effect degree is set by the random number (S126, see TABLE 3). If TP3≠0, the special effect degree is set by TP3 other than 0.

Then, whether the trigger information parameter TP4 is 0 or not is judged at S128. If TP4=0, the random number generator 42 generates a random number within 1 to 10, and the trigger information is set by the random number (S130, see TABLE 4). If TP4≠0, the trigger information is set by TP4 other than 0. When the communication interface 48 does not connect to the external equipment such as the karaoke machine or the game machine, the random number other than 10 is generated if TP4=0, or resettling of TP4 is required if TP4=10.

After the special effect is set as stated above, the image-capturing is performed at S132, and the procedure goes to S134 in FIG. 14.

At S134, it is judged whether the image-capturing is performed upon receiving the external trigger signal or not. If yes, the external equipment information is acquired (S136). The external equipment information relates to the data on images and scores displayed on the external equipment such as the karaoke machine or the game machine, the data indicating the area where the unaltered image is combined, or the like. Then, the template image is selected in accordance with the external equipment information (S138). The selected template image is combined with the unaltered image captured at S132 (S140). At the same time, the character information such as the image-capturing date, which is generated by the character generator 22, may be combined with them.

If it is judged at S134 as the image-capturing being not performed upon receiving the external trigger signal (in other words, the image-capturing is performed upon operating the image-capturing/frame-forwarding switch 61), the procedure goes to S142, at which whether TP2≧4 or not is judged. If not TP2≧4, one template image is selected from the group of template images selected by TP2 in accordance with the trigger information selected by TP4 (S138). The selected template image is combined with the unaltered image captured at S132 (S140). The special effect image is thus composed from the unaltered image and the template image, and is then displayed on the LCD 46 (S146).

On the other hand, if TP2≧4 at S142, the unaltered image captured at S132 is image-processed in accordance with the special effect type set by TP2 and the special effect degree set by TP3 (S144). The special effect image is thus created from the unaltered image in accordance with the special effect type and the special effect degree, and is then displayed on the LCD 46 (S146).

Next, whether the recording time parameter TP1 is 0 or not is judged (S148). If TP1=0, the camera information (including the camera sensing information) in the image-capturing is embedded in the image file (S150), and it is judged whether the file format switch 63 is positioned at "image file" or "procedure file" (S152). The file format switch 63 is operated to select a format of the image file in the recording. If the file format switch 63 is positioned at "image file", the special effect image data is recorded. If the file format switch 63 is positioned at "procedure file", special effect data (a procedure file) representing the special effect applied to the unaltered image, as well as the unaltered image data, is recorded.

At S152, if the file format switch 63 is positioned at "image file", the special effect image data is recorded in the external memory 50 (S154). If the file format switch 63 is positioned at "procedure file", the procedure file representing the special effect applied to the unaltered image, as well as the unaltered image data, is recorded in the external memory 50 (S156).

Then, it is judged whether the image-recording mode is the continuous recording mode or the single recording mode (S158). If the image-recording mode is the single recording mode, the image-recording mode sequence is completed. If the image-recording mode is the continuous recording mode, the procedure returns to S100 in FIG. 13.

On the other hand, if TP1≠0 at S148, whether the timer setting parameter TP5 is 0 or not is judged (S160). If TP5=0, the procedure goes to S162, and if TP5≠0, the procedure goes to S164. At S162 and S164, whether the settling/recording switch 66 is turned on or not is judged. If the settling/recording switch 66 is turned on, the procedure goes to S150 so that the special effect image, etc. can be recorded as stated previously.

On the other hand, if the settling/recording switch 66 is not turned on at S164, it is judged whether a preset time has elapsed or not since the currently-applied special effect is set (S166). The preset time is suitable for the user to determine whether to record the currently-created special effect image or not by looking at the preview screen of the LCD 46, which is displayed at S146. The timer 44 detects the passage of the preset time.

If the preset time has elapsed at S166, the special effect applied to the unaltered image is reset at S168–S178. At S168–S178, the special effect is set in the same manner as the above-mentioned S120–S130. After the special effect is reset, the procedure returns to S134.

Thus, if TP1≠0, TP5≠0 and the settling/recording switch 66 is not turned on, different special effects are sequentially applied to the unaltered image at regular intervals to create different special effect images, which are sequentially displayed on the LCD 46. Then, the user can selectively record a favorite special effect image by operating the settling/recording switch 66 while looking at the preview screen of the LCD 46 in the recording mode.

Figure 15:
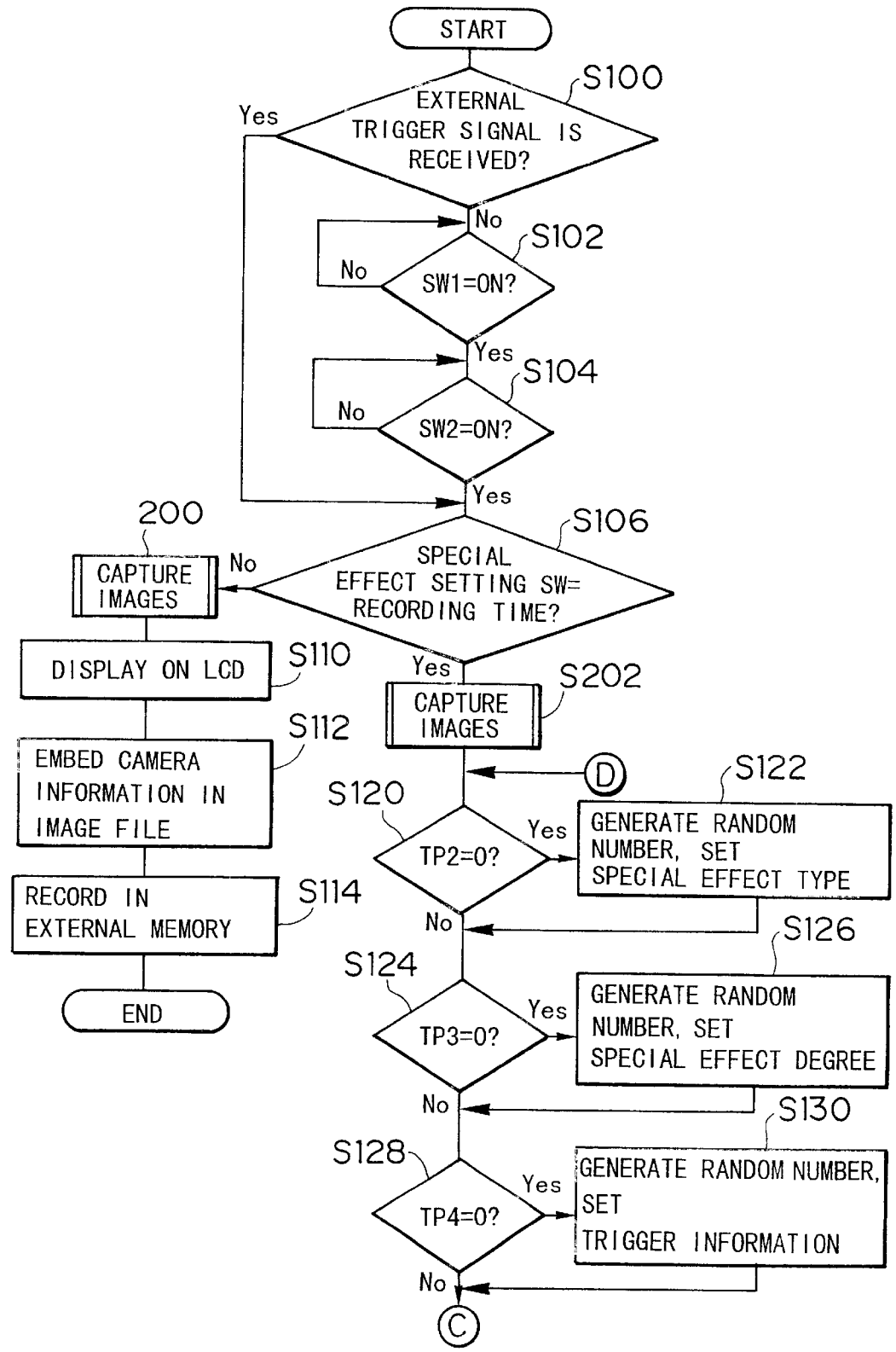
FIG. 15 is a flow chart showing a continuous image-capturing mode sequence.
Figure 16:
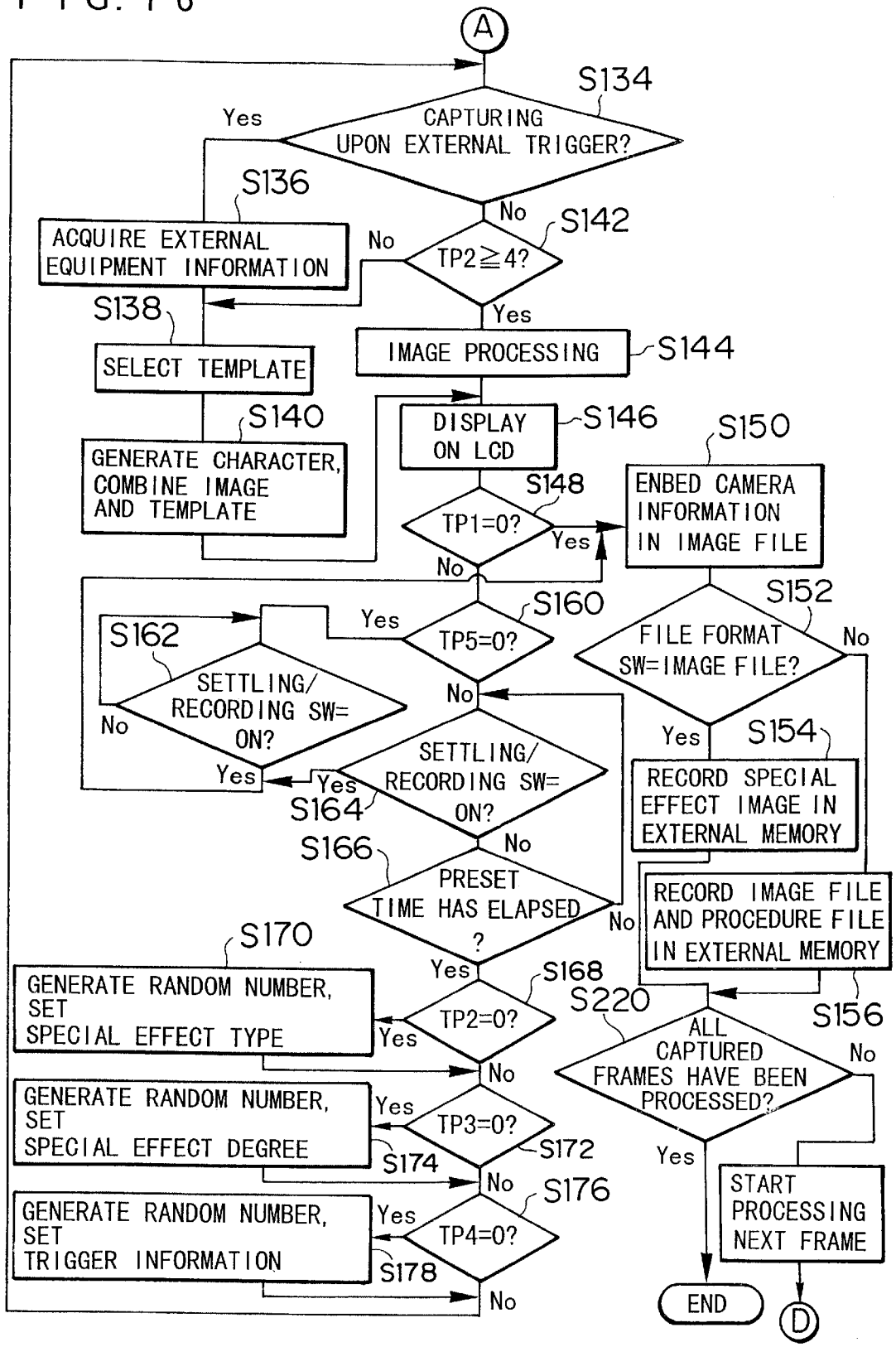
FIG. 16 is a flow chart following the flow in FIG. 15.
Figure 17:
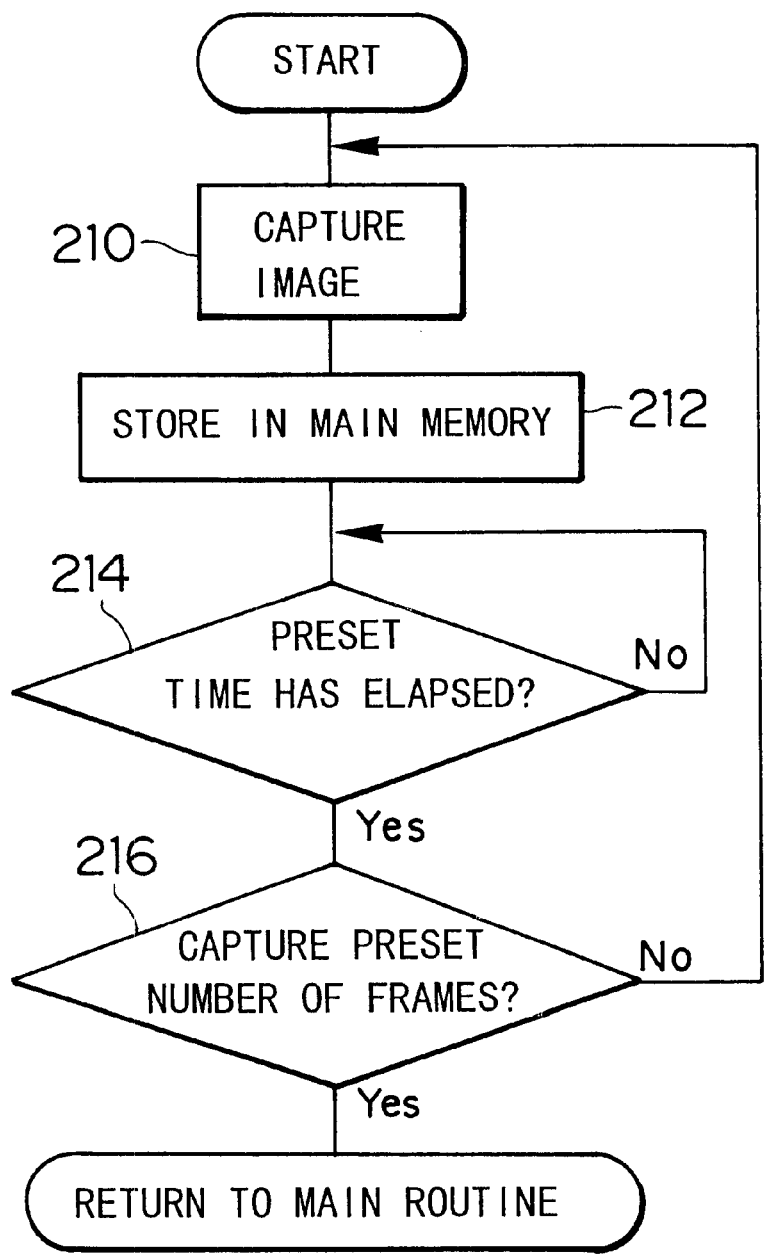
FIG. 17 is a flow chart showing a subroutine for a continuous image-capturing.

A description will hereunder be given of the procedure for capturing a plurality of unaltered images by continuous image-capturing, and then applying the special effects to all of the unaltered images, with reference to FIGS. 15–17.

In FIGS. 15 and 16, the same steps as those described with reference to FIGS. 13 and 14 are denoted by the same reference numerals. A description will be given about the processes that are different from the image-recording mode sequence in FIGS. 13 and 14.

The procedure in FIG. 15 is different from the procedure in FIG. 13 in that S200 and S202 are performed instead of S108 and S132. At S200 and S202, the continuous image-capturing is performed as described in a subroutine in FIG. 17. Specifically, an image is captured (S210), and the image data of one frame, which is obtained by the CCD imaging system 10, is stored in the main memory 40 (S212). Then, it is judged whether a preset time has elapsed or not (S214). The preset time is an interval at which the frames are captured continuously, and it is previously set on the screen of the LCD 46 in the continuous recording mode.

If the preset time has elapsed at S214, it is judged whether a preset number of frames have been captured or not (S216). The preset number is previously set on the screen on the LCD 46 in the continuous recording mode.

If the preset number of frames have not been captured yet, the procedure returns to S210 and S210–S216 are repeated.

If it is judged at S216 that the preset number of frames have already been captured, the continuous image-capturing is completed and the procedure returns to the main routine in FIG. 15.

Thus, the preset number of frames are captured at the preset regular intervals, and the image data of the frames is stored in the main memory 40.

When the continuous image-capturing is completed at S202 in FIG. 15, what special effect is applied to the unaltered image of a certain frame is set at S120–S130. Then, the procedure goes to FIG. 16.

The procedure in FIG. 16 is different from the procedure in FIG. 14 in that S220 is performed instead of S158. Specifically, after the special effect image of a certain frame is recorded, it is judged whether all images of the continuously-captured frames have already been processed or not at S220. If yes, the procedure is completed, and if not all images of the captured frames have been processed yet, the procedure returns to S120 in FIG. 15 so that the unaltered image of the next frame can be processed.

The special effects are applied to all images of the continuously-captured frames in the above-mentioned manner.

A plurality of continuously-captured images may be recorded as one frame. In order to apply one special effect to the one frame composed of the plurality of continuously-captured images, the continuous image-capturing procedure in FIG. 17 is performed instead of S108 and S132 in FIG. 13, and the other processes are performed in the same manner as described in FIGS. 13 and 14.

Figure 18:
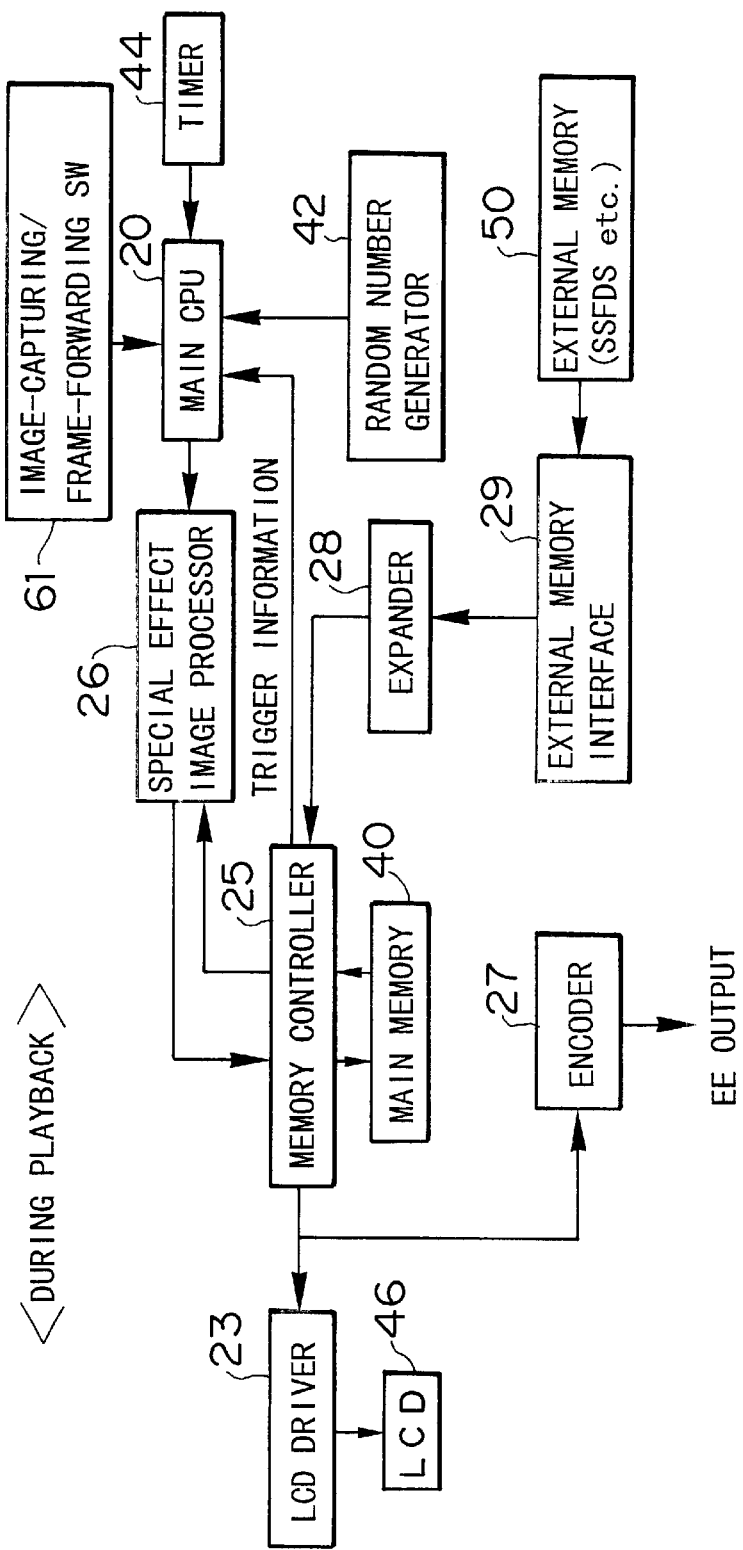
FIG. 18 is a block diagram showing the flow of the data when the special effect is applied to the unaltered image during the playback.
Figure 19:
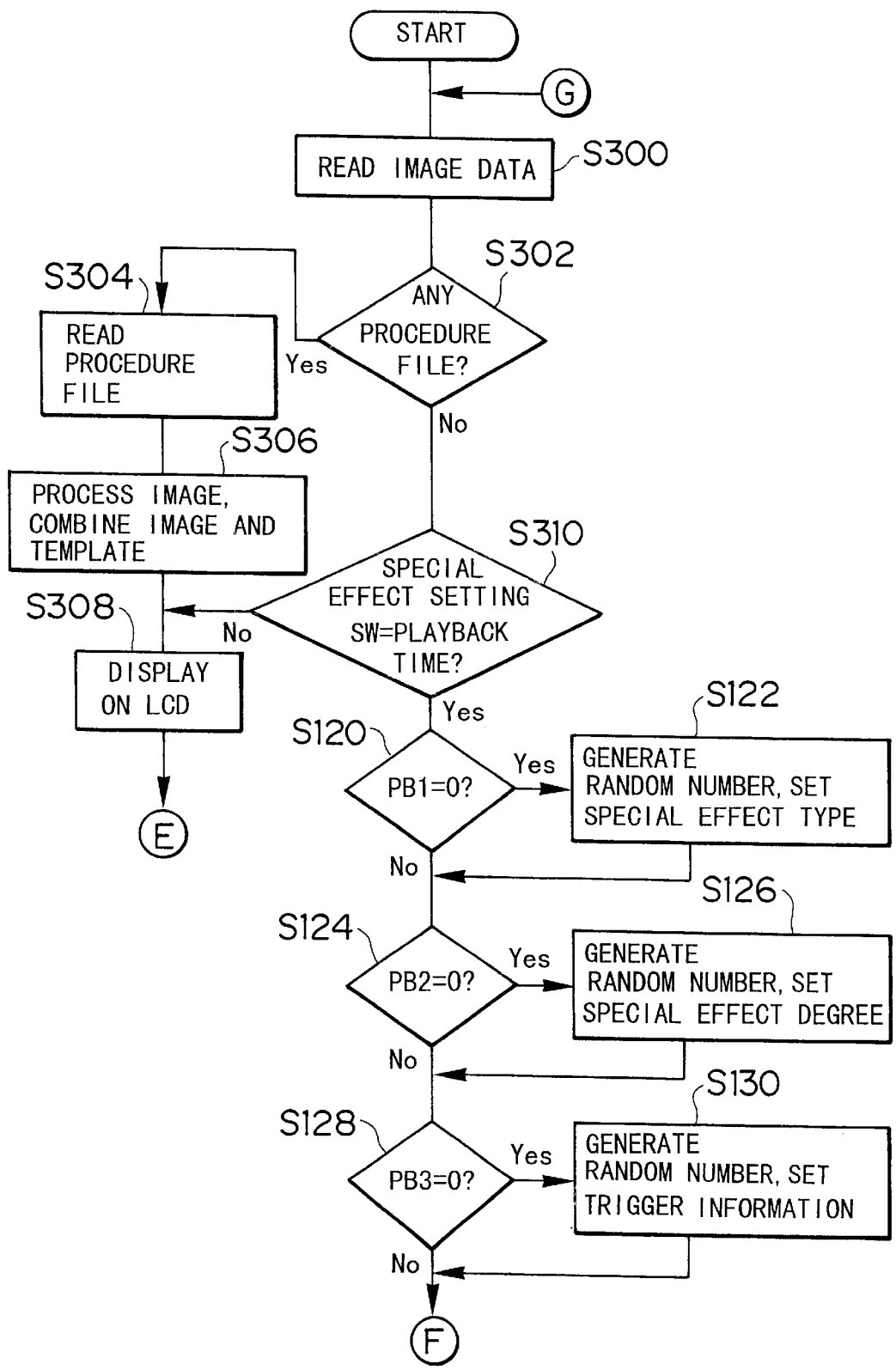
FIG. 19 is a flow chart showing a playback mode sequence of applying the special effect to the unaltered image during the playback.
Figure 20:
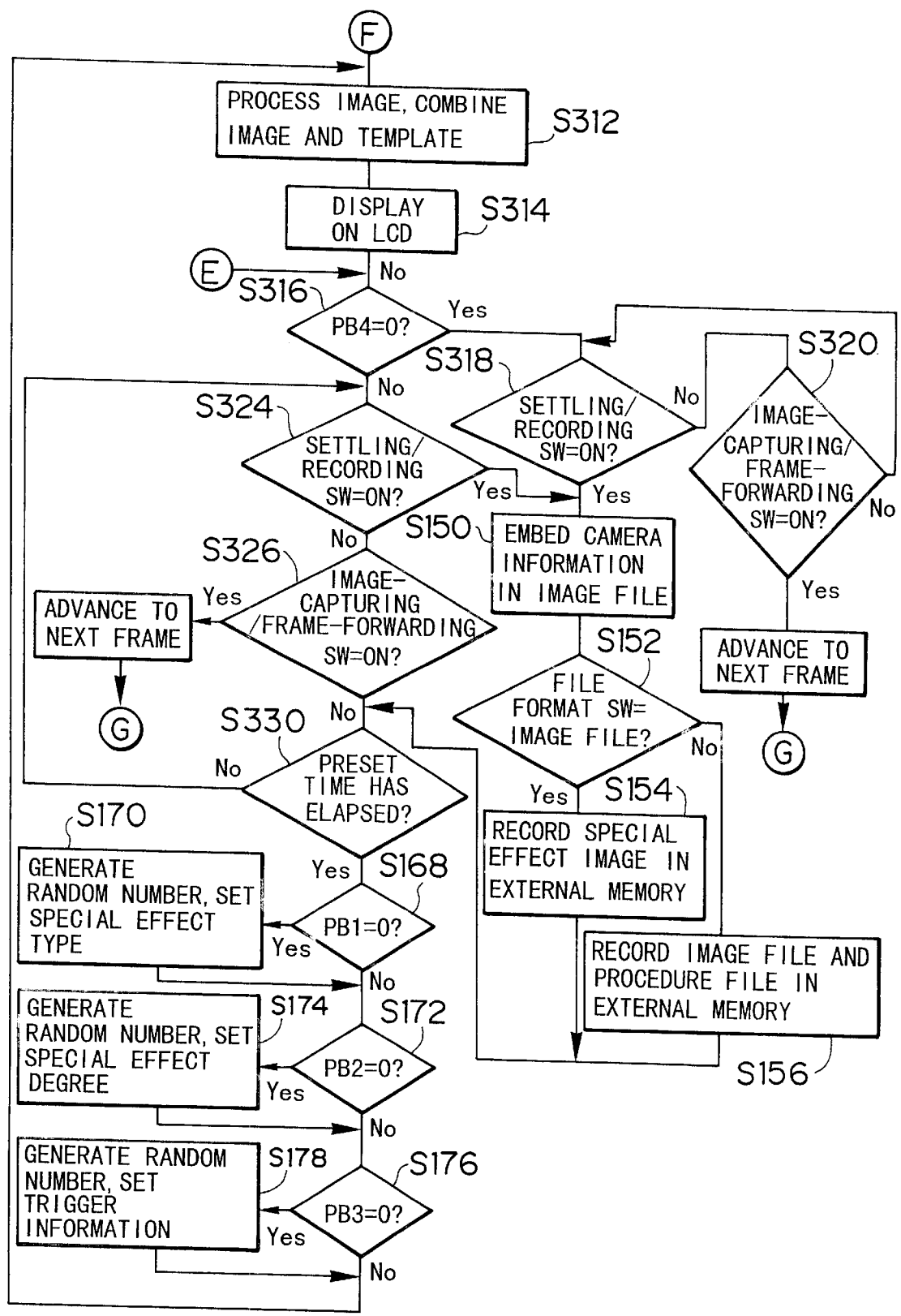
FIG. 20 is a flow chart following the flow in FIG. 19.

A description will hereunder be given of the procedure for applying the special effect to the unaltered image in the playback time with reference to FIGS. 18–20.

FIG. 18 is a block diagram showing the flow of the data when the special effect is applied to the unaltered image during the playback. FIGS. 19 and 20 are flow charts showing the playback mode sequence. In FIG. 18, parts similar to those described in FIG. 1 are denoted by the same reference numerals, and in FIGS. 19 and 20, steps similar to those described in FIGS. 13 and 14 are denoted by the same reference numerals.

The playback mode sequence starts when the playback mode is selected by operating the mode switch 62. First, as shown in FIG. 19, the image data of one frame is read from the external memory 50 through the external memory interface 29 (S300). Since the playback mode sequence aims to apply the special effect to the unaltered image during the playback, the unaltered image data is read primarily, but if the special effect has already been applied to the unaltered image, the special effect image data, or a combination of the unaltered image data and the procedure file (the special effect data) representing the special effect applied to the unaltered image, is read. The read data is stored in the main memory 40 through the compression/expansion processor 28 and the memory controller 25. If the read image data has been compressed, the data is expanded by the compression/expansion processor 28.

Then, whether the read data includes the procedure file or not is judged (S302). If the data includes the procedure file, the special effect image processor 26 reads the procedure file (S304), and performs the image processing for applying the special effect to the unaltered image (including the combining with the template image) in accordance with the procedure file, thereby creating the special effect image data (S306). The LCD driver 23 is driven in accordance with thus created special effect image data, and the special effect image is displayed on the LCD 46 (S308).

If the read data does not include the procedure file at S302, it is judged whether the special effect setting switch 64 is set to the setting of the special effect in the playback time or not (S310). If the special effect setting switch 64 is not set to the setting of the special effect in the playback time, the LCD driver 23 is driven in accordance with the read image data, and the read image is displayed on the LCD 46 (S308).

After the image is displayed on the LCD 64, the procedure goes to S316 in FIG. 20.

On the other hand, if the special effect setting switch 64 is set to the setting of the special effect in the playback time, what special effect is applied to the read unaltered image is set at S120–S130.

After the special effect is set at S120–S130, the procedure goes to S312 in FIG. 20. At S312, the image processing is performed to apply the special effect to the unaltered image (including the combining with the template image) in accordance with the read image and the set special effect so that the special effect image can be created. The created special effect image is displayed on the LCD 46 (S314).

Then, whether the timer setting parameter PB4 is 0 or not is judged at S316. If PB4=0, the procedure goes to S318, and if PB4≠0, the procedure goes to S324. At S318 and S324, whether the settling/recording switch 66 is turned on or not is judged. If the settling/recording switch 66 is turned on, the procedure goes to S150 so that the special effect image, etc. can be recorded. After the recording, the procedure goes to S330.

On the other hand, if the settling/recording switch 66 is not turned on at S318, it is judged whether the image-capturing/frame-forwarding switch 61 is turned on or not (S320). If the image-capturing/frame-forwarding switch 61 is turned on, the procedure returns to S300 in FIG. 19 to advance to the next frame and read the image data, etc. of the next frame from the external memory 50.

If the settling/recording switch 66 is not turned on at S324, whether the image-capturing/frame-forwarding switch 61 is turned on or not is judged (S326). If the image-capturing/frame-forwarding switch 61 is turned on, the procedure returns to S300 in FIG. 19 to advance to the next frame and read the image data, etc. of the next frame from the external memory 50.

If the image-capturing/frame-forwarding switch 61 is not turned on at S326, it is judged whether a preset time has elapsed or not since the currently-applied special effect is set (S330). If the preset time has elapsed at S330, the special effect applied to the read image is reset at S168–S178.

Thus, if PB4≠0 and neither the settling/recording switch 66 nor the image-capturing/frame-forwarding switch 61 is turned on, different special effects are sequentially applied to the read unaltered image at regular intervals to create different special effect images, which are sequentially displayed on the LCD 46. Then, the user can selectively record a favorite special effect image by operating the settling/recording switch 66 while looking at the preview screen of the LCD 46 in the playback mode.

Figure 22:
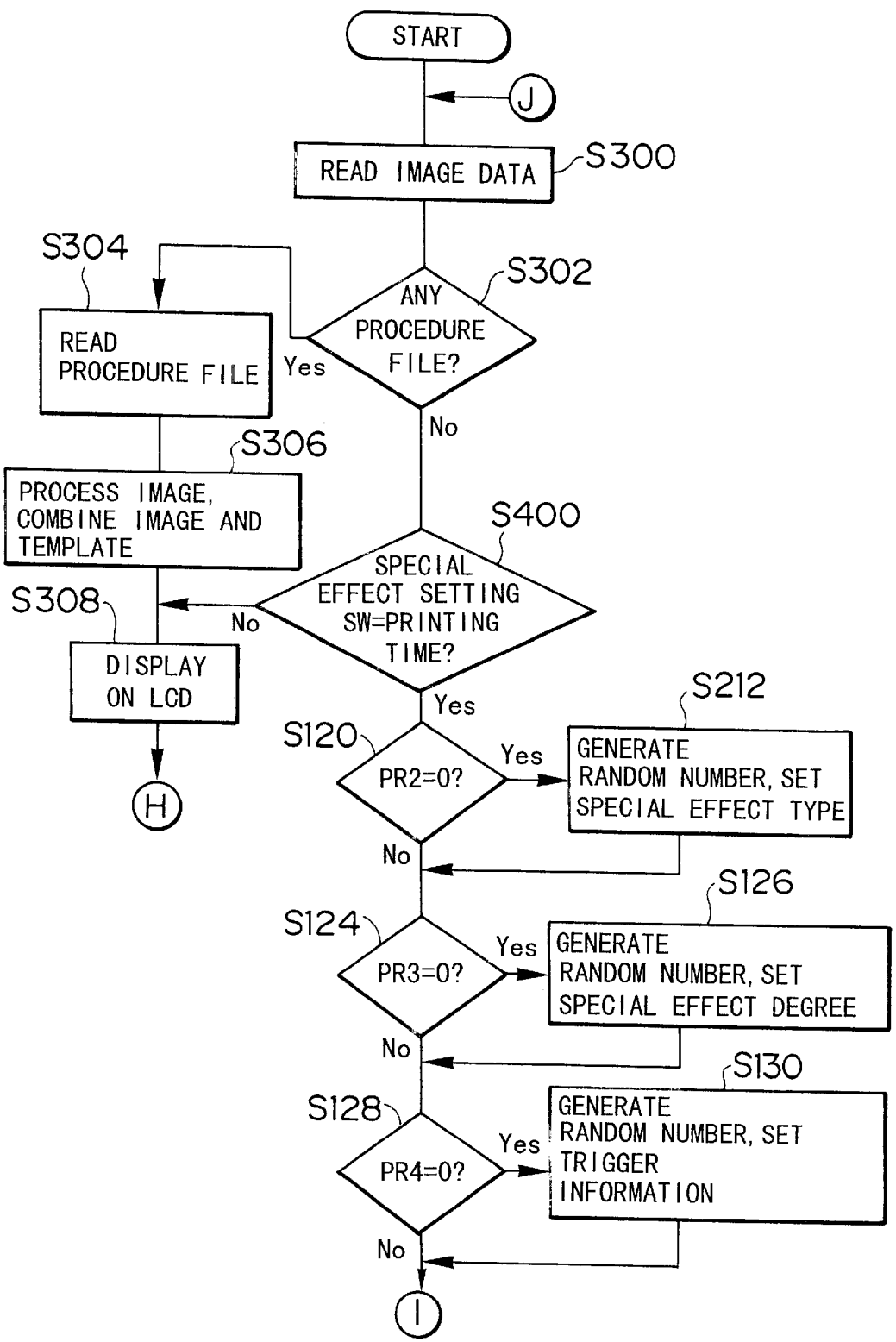
FIG. 22 is a flow chart showing a playback mode sequence of applying the special effect to the unaltered image during the printing.
Figure 23:
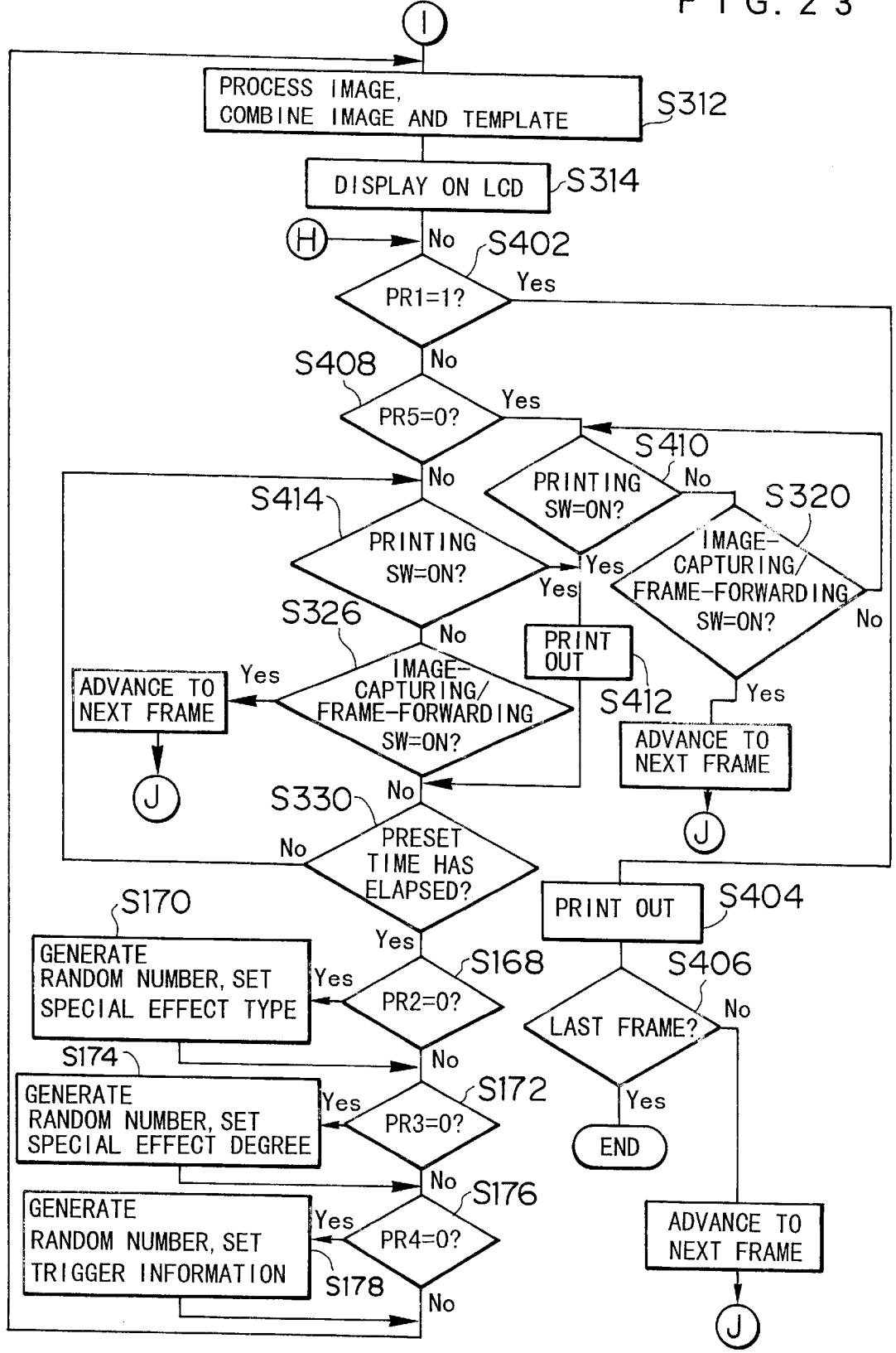
FIG. 23 is a flow chart following the flow in FIG. 22.

A description will hereunder be given of the procedure for applying the special effect to the unaltered image in the printing time with reference to FIGS. 21–23.

FIG. 21 is a block diagram showing the flow of the data when the special effect is applied to the unaltered image during the printing. FIGS. 22 and 23 are flow charts showing the printing mode sequence. In FIG. 21, parts similar to those described in FIG. 1 are denoted by the same reference numerals, and in FIGS. 22 and 23, steps similar to those described in FIGS. 19 and 20 are denoted by the same reference numerals.

The printing mode sequence starts when the printing mode is selected by operating the mode switch 62. The procedure in FIG. 22 is different from the procedure in FIG. 19 in that S400 is performed instead of S310. Specifically, it is judged whether the special effect setting switch 64 is set to the setting of the special effect in the playback time or not at S310 in FIG. 19, while it is judged whether the special effect setting switch 64 is set to the setting of the special effect in the printing time or not at S400 in FIG. 22. The procedure in FIG. 22 is similar to the procedure in FIG. 19 except for S400, and a detailed explanation thereof will be omitted.

After the special effect image, which is created by applying the special effect to the read image in the printing mode, is displayed on the LCD at S314 in FIG. 23, whether the printing mode parameter PR1 is 1 or not is judged (S402). If PR1=1 (the automatic printing mode), the read image is printed out (S404). Specifically, as shown in FIG. 21, the special effect image data, etc. stored in the main memory 40 is read out by the memory controller 25, and it is sent to an external printer 49 through the communication interface 48. Consequently, the same image as the image displayed on the LCD 46 is printed out.

After the printout, it is judged whether the last frame among the frames stored in the external memory 50 has already been printed out or not (S406). If the last frame has already been printed out, the automatic printing mode is completed. If not, the procedure returns to S300 in FIG. 22 to advance to the next frame and read the image data, etc. of the next frame from the external memory 50.

On the other hand, if PR1≠1 (the manual printing mode) at S402, whether the timer setting parameter PR5 is 0 or not is judged (S408). If PR5=0, the procedure goes to S410, and if PR5≠0, the procedure goes to S414. At S410 and S414, whether the printing switch 65 is turned on or not is judged. If the printing switch 65 is turned on, the procedure goes to S412 so that the image can be printed out. After the printout, the procedure goes to S330.

If the printing switch 65 is not turned on at S410, whether the image-capturing/frame-forwarding switch 61 is turned on or not is judged (S320). If the image-capturing/frame-forwarding switch 61 is turned on, the procedure returns to S300 in FIG. 22 to advance to the next frame and read the image data, etc. of the next frame from the external memory 50.

If the printing switch 65 is not turned on at S414, whether the image-capturing/frame-forwarding switch 61 is turned on or not is judged (S326). If the image-capturing/frame-forwarding switch 61 is turned on, the procedure returns to S300 in FIG. 22 to advance to the next frame and read the image data, etc. of the next frame from the external memory 50.

On the other hand, if the image-capturing/frame-forwarding switch 61 is not turned on at S326, it is judged whether a preset time has elapsed or not since the currently-applied special effect is set (S330). If the preset time has elapsed at S330, the special effect applied to the read image is reset at S168–S178.

Thus, if PR1≠0, PR5≠0, and neither the printing switch 65 nor the image-capturing/frame-forwarding switch 61 is turned on, different special effects are sequentially applied to the read image at regular intervals to create different special effect images, which are sequentially displayed on the LCD 46. Then, the user can selectively print a favorite special effect image by operating the printing switch 65 while looking at the preview screen of the LCD 46 in the printing mode.

The type of the template image combined with the unaltered image is not restricted to this embodiment. For example, a template image representing an affinity, biorhythm, etc., may also be adopted. The type of the filter (distorting) operation for applying the special effect to the unaltered image is not restricted to this embodiment. For example, the filter operations can be performed to apply the following special effects: deformation, sepia tone, black-and-white, shading, vignette, back-light, mosaic, oil printing tone, pointillism, solarization, color subtraction, color balance loss, high key, low key, or the like.

When the filter is applied, it is possible to select or restrict a filter-applied area. If the filter-applied area is show on the LCD, the user can record the image while looking at the LCD in such a way that the main subject is within the filter-applied area or that the main subject is outside the filter-applied area. For example, the face of the subject may not be filtered, or the eyes, nose or mouth of the subject may be filtered. If the filter-applied area is not designated, the whole image is filtered.

As set forth hereinabove, according to the present invention, the randomly-selected special effect is applied to the unaltered image representing the subject image, and it is therefore possible to easily obtain an interesting and unexpected image. If the preset time has elapsed in the state wherein neither the recording switch nor the printing switch is turned on, the special effect may be randomly selected again. For this reason, it is possible to record or print only the image applied with the favorite special effect.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A digital camera comprising:
   an imaging system for imaging a subject and converting a subject image into unaltered image data representing an unaltered image of the subject;
   a special effect selector within the digital camera provided with a random number generator generating a random number, the special effect selector selecting one special effect from a plurality of special effects in accordance with the random number; and
   a special effect image processor within the digital camera for image-processing the unaltered image data under the special effect selected by the special effect selector to thereby obtain special effect image data representing an unexpected special effect image.

2. The digital camera as defined in claim 1, further comprising a recorder for recording the special effect image data into a recording medium.

3. The digital camera as defined in claim 2, further comprising:
   a recording switch for commanding the recorder to record the special effect image data into the recording medium; and
   a timer for detecting whether a preset time has elapsed without the recording switch being operated;
   wherein when the timer detects that the preset time has elapsed without the recording switch being operated, the special effect selector is reactivated to select another of the special effects.

4. The digital camera as defined in claim 1, further comprising a recorder for recording, when an image-capturing switch is operated or when a trigger signal is inputted from external equipment, the unaltered image data and special effect data representing the special effect applied to the unaltered image into a recording medium.

5. The digital camera as defined in claim 4, further comprising:
   a frame-forwarding switch; and
   a data reader for reading the unaltered image data and the special effect data of a desired frame from the recording medium according to operation of the frame-forwarding switch;
   wherein the special effect image processor performs the image processing in accordance with the unaltered image data and the special effect data read by the data reader.

6. The digital camera as defined in claim 4, further comprising:
   a recording switch for commanding the recorder to record the unaltered image data and the special effect data into the recording medium; and
   a timer for detecting whether a preset time has elapsed without the recording switch being operated;
   wherein when the timer detects that the preset time has elapsed without the recording switch being operated, the special effect selector is reactivated to select another of the special effects.

7. The digital camera as defined in claim 1, wherein when an image-capturing switch is operated or when a trigger signal is inputted from external equipment, the special effect selector and the special effect image processor are activated.

8. The digital camera as defined in claim 1, further comprising:
   a recorder for recording, when an image-capturing switch is operated or when a trigger signal is inputted from external equipment, the unaltered image data into a recording medium;
   a frame-forwarding switch; and
   a data reader for reading the unaltered image data from the recording medium according to operation of the frame-forwarding switch;
   wherein every time the data reader reads the unaltered image data of one frame from the recording medium, the special effect selector and the special effect image processor are activated.

9. The digital camera as defined in claim 1, further comprising:
   a recorder for recording, when an image-capturing switch is operated or when a trigger signal is inputted from external equipment, the unaltered image data into a recording medium;
   a frame-forwarding switch;
   a data reader for reading the unaltered image data from the recording medium according to operation of the frame-forwarding switch; and
   an interface for sending the special effect image data to an external printer;
   wherein every time the data reader reads the unaltered image data of one frame from the recording medium, the special effect selector and the special effect image processor are activated.

10. The digital camera as defined in claim 9, further comprising:
    a printing switch for commanding the interface to send the special effect image data to the external printer; and
    a timer for detecting whether a preset time has elapsed without the printing switch being operated;
    wherein when the timer detects that the preset time has elapsed without the printing switch being operated, the special effect selector is reactivated to select another of the special effects.

11. The digital camera as defined in claim 1, further comprising:
    a recorder for recording, when an image-capturing switch is operated or when a trigger signal is inputted from external equipment, the unaltered image data into a recording medium;
    a mode setting device for setting an automatic printing mode in which the special effect images are printed continuously;
    a data reader for sequentially reading the unaltered image data from the recording medium prior to printing; and
    an interface for sending the special effect image data to an external printer;
    wherein every time the data reader reads the unaltered image data of one frame from the recording medium, the special effect selector and the special effect image processor are activated.

12. The digital camera as defined in claim 1, further comprising an image display for displaying at least one of the unaltered image and the special effect image.

13. The digital camera as defined in claim 12, further comprising a recorder for recording the special effect image data into a recording medium.

14. The digital camera as defined in claim 13, further comprising:
    a recording switch for commanding the recorder to record the special effect image data into the recording medium; and
    a timer for detecting whether a preset time has elapsed without the recording switch being operated;
    wherein when the timer detects that the preset time has elapsed without the recording switch being operated, the special effect selector is reactivated to select another of the special effects.

15. The digital camera as defined in claim 12, further comprising a recorder for recording, when an image-capturing switch is operated or when a trigger signal is inputted from external equipment, the unaltered image data and special effect data representing the special effect applied to the unaltered image into a recording medium.

16. The digital camera as defined in claim 15, further comprising:
    a frame-forwarding switch; and
    a data reader for reading the unaltered image data and the special effect data of a desired frame from the recording medium according to operation of the frame-forwarding switch;
    wherein the special effect image processor performs the image processing in accordance with the unaltered image data and the special effect data read by the data reader.

17. The digital camera as defined in claim 15, further comprising:
    a recording switch for commanding the recorder to record the unaltered image data and the special effect data into the recording medium; and a timer for detecting whether a preset time has elapsed without the recording switch being operated;

wherein when the timer detects that the preset time has elapsed without the recording switch being operated, the special effect selector is reactivated to select another of the special effects.

18. The digital camera as defined in claim 12, further comprising a display changeover switch for selecting one of the unaltered image, the special effect image and a mix image created by mixing the unaltered image with the special effect image, such that the selected image is displayed on the image display.

19. The digital camera as defined in claim 12, further comprising:

a recorder for recording, when an image-capturing switch is operated or when a trigger signal is inputted from external equipment, the unaltered image data into a recording medium;

a frame-forwarding switch; and a data reader for reading the unaltered image data from the recording medium according to operation of the frame-forwarding switch;

wherein every time the data reader reads the unaltered image data of one frame from the recording medium, the special effect selector and the special effect image processor are activated.

20. The digital camera as defined in claim 12, further comprising:

a recorder for recording, when an image-capturing switch is operated or when a trigger signal is inputted from external equipment, the unaltered image data into a recording medium;

a frame-forwarding switch;

a data reader for reading the unaltered image data from the recording medium according to operation of the frame-forwarding switch; and an interface for sending the special effect image data to an external printer;

wherein every time the data reader reads the unaltered image data of one frame from the recording medium, the special effect selector and the special effect image processor are activated.

21. The digital camera as defined in claim 20, further comprising:

a printing switch for commanding the interface to send the special effect image data to the external printer; and a timer for detecting whether a preset time has elapsed without the printing switch being operated;

wherein when the timer detects that the preset time has elapsed without the printing switch being operated, the special effect selector is reactivated to select another of the special effects.

22. The digital camera as defined in claim 12, further comprising:

a recorder for recording, when an image-capturing switch is operated or when a trigger signal is inputted from external equipment, the unaltered image data into a recording medium;

a mode setting device for setting an automatic printing mode in which the special effect images are printed continuously;

a data reader for sequentially reading the unaltered image data from the recording medium prior to printing; and an interface for sending the special effect image data to an external printer;

wherein every time the data reader reads the unaltered image data of one frame from the recording medium, the special effect selector and the special effect image processor are activated.

23. An image processing method provided in a digital camera, comprising the steps of:

imaging a subject and converting a subject image into unaltered image data representing an unaltered image of the subject upon receiving a command to image-capture;

generating a random number by a random number generator;

selecting one special effect from a plurality of special effects in accordance with the random number; and image-processing: the unaltered image data under the selected special effect to thereby obtain special effect image data representing an unexpected special effect image.

24. The image processing method as defined in claim 23, wherein the plurality of special effects include an operation of combining the unaltered image with a template image selected from a plurality of template images stored in advance.

25. The image processing method as defined in claim 24, wherein the plurality of special effects include at least two of the following: lean and fat by changing magnification in length and width of the unaltered image, deformation, morphing, soft-focus, blur, fair-complexioned or dark-complexioned by changing an AE level, sepia tone, black-and-white, shading, vignette, back-light, mosaic, oil printing tone, pointillism, solarization, color subtraction, color balance loss, high key, and low key.

26. The image processing method as defined in claim 23, wherein the plurality of special effects include at least two of the following: lean and fat by changing magnification in length and width of the unaltered image, deformation, morphing, soft-focus, blur, fair-complexioned or dark-complexioned by changing an AE level, sepia tone, black-and-white, shading, vignette, back-light, mosaic, oil printing tone, pointillism, solarization, color subtraction, color balance loss, high key, and low key.

27. The image processing method as defined in claim 23, wherein when an image-capturing switch is operated or when a trigger signal is inputted from external equipment, the selecting step is performed.

28. The image processing method as defined in claim 23, further comprising the steps of:

recording the unaltered image data into a recording medium; and reading the unaltered image data from the recording medium and then performing the generating step and the selecting step.

29. An image processing method in a digital camera, comprising the steps of:

(a) imaging a subject and converting a subject image into unaltered image data representing an unaltered image in a frame;

(b) recording the unaltered image data in the frame into a recording medium;

(c) repeating the steps (a)–(b) a preset number of times to thereby record the unaltered image data in the preset number of the frames;

(d) reading the recorded unaltered image data in one of the preset number of the frames from the recording medium recorded in the step (c);

(e) generating a random number by a random number generator;

(f) selecting one special effect from a plurality of special effects in accordance with the random number;

(g) image-processing the unaltered image data read in the step (d) under the special effect selected in the step (f) to thereby obtain special effect image data representing a special effect image;

(h) recording the special effect image data obtained in the step (g) into the recording medium; and (i) repeating the steps (d)–(h) for the recorded unaltered image data in the preset number of the frames.

30. An image processing method in a digital camera, comprising the steps of:

(a) imaging a subject and converting a subject image into unaltered image data representing an unaltered image in a frame;

(b) generating a random number by a random number generator;

(c) selecting one special effect from a plurality of special effects in accordance with the random number;

(d) recording a combination of the unaltered image data in the frame and special effect data representing the special effect selected in the step (c) into a recording medium;

(e) repeating the steps (a)–(d) a preset number of times to thereby record the preset number of the combinations of the unaltered image data and the special effect data;

(f) reading one of the combinations of the unaltered image data and the special effect data recorded in the step (e);

(g) image-processing the unaltered image data read in the step (f) under the special effect represented by the special effect data read in the step (f) to thereby obtain special effect image data representing a special effect image;

(h) recording the special effect image data obtained in the step (g) into the recording medium; and (i) repeating the steps (f)–(h) for the preset number of the combinations of the unaltered image data and the special effect data.

31. An image processing method in a digital camera, comprising the steps of:

(a) imaging a subject and converting a subject image into unaltered image data representing an unaltered image of the subject upon receiving a command to image-capture;

(b) generating a random number by a random number generator;

(c) selecting one special effect from a plurality of special effects in accordance with the random number;

(d) image-processing the unaltered image data under the selected special effect to thereby obtain special effect image data representing a special effect image;

(e) displaying the special effect image on an image display in accordance with the special effect image data; and (f) if a recording switch is operated, recording the special effect image data into a recording medium, and if a preset time has elapsed without the recording switch being operated, repeating the steps (b)–(f).

32. An image processing method in a digital camera, comprising the steps of:

(a) imaging a subject and converting a subject image into unaltered image data representing an unaltered image of the subject upon receiving a command to image-capture;

(b) recording the unaltered image data into a recording medium;

(c) reading the unaltered image data from the recording medium according to operation of a frame-forwarding switch;

(d) generating a random number by a random number generator;

(e) selecting one special effect from a plurality of special effects in accordance with the random number;

(f) image-processing the unaltered image data under the selected special effect to thereby obtain special effect image data representing a special effect image;

(g) displaying the special effect image on an image display in accordance with the special effect image data; and (h) if a printing switch is operated, sending the special effect image data to an external printer so as to print the special effect image on the external printer, and if a preset time has elapsed without the printing switch being operated, repeating the steps (d)–(h).

* * * * *

UNITED STATES PATENT AND TRADEMARK OFFICE
CERTIFICATE OF CORRECTION

PATENT NO. : 6,546,187 B1 Page 1 of 1
DATED : April 8, 2003
INVENTOR(S) : Miyazaki et al.

It is certified that error appears in the above-identified patent and that said Letters Patent is hereby corrected as shown below:

Column 18,
Line 48, insert the word -- automatically -- after "selector".

Column 22,
Line 13, insert the word -- automatically -- before "selecting".

Signed and Sealed this

Nineteenth Day of August, 2003

JAMES E. ROGAN
*Director of the United States Patent and Trademark Office*